US008145055B2

(12) United States Patent
Niibe et al.

(10) Patent No.: US 8,145,055 B2
(45) Date of Patent: Mar. 27, 2012

(54) PASSIVE OPTICAL NETWORK SYSTEM, OPTICAL LINE TERMINATOR AND OPTICAL NETWORK UNIT

(75) Inventors: Masao Niibe, Fujisawa (JP); Masahiko Mizutani, Yokohama (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 12/389,675

(22) Filed: Feb. 20, 2009

(65) Prior Publication Data

US 2010/0034534 A1 Feb. 11, 2010

(30) Foreign Application Priority Data

Aug. 7, 2008 (JP) ................................. 2008-204694

(51) Int. Cl.
*H04B 10/08* (2006.01)
*H04B 17/00* (2006.01)
(52) U.S. Cl. .......................................................... 398/25
(58) Field of Classification Search .................... 398/35, 398/67
See application file for complete search history.

(56) References Cited

U.S. PATENT DOCUMENTS

| 7,941,055 | B2* | 5/2011 | Huang et al. .................. 398/158 |
| 2005/0238357 | A1* | 10/2005 | Farrell ........................... 398/119 |
| 2009/0052894 | A1* | 2/2009 | Murata ........................... 398/43 |

FOREIGN PATENT DOCUMENTS

WO    WO 2007/102303 A1 *  9/2007

OTHER PUBLICATIONS

"Series G: Transmission System and Media, Digital Systems and Networks", ITU-T Recommendation G.984.1, Mar. 2003.
"Series G: Transmission System and Media, Digital Systems and Networks", ITU-T Recommendation G.984.2, Mar. 2003.
"Series G: Transmission System and Media, Digital Systems and Networks", ITU-T Recommendation G.984.3, Feb. 2004.
"Series G: Transmission System and Media, Digital Systems and Networks", ITU-T Recommendation G.984.2, Amendment 1, Feb. 2006.

* cited by examiner

*Primary Examiner* — Shi K Li
(74) *Attorney, Agent, or Firm* — Antonelli, Terry, Stout & Kraus, LLP.

(57) ABSTRACT

In a PON, at the time of ranging, an OLT (a master station) measures an optical level of a signal from at least an ONU (a slave station) capable of communicating at plural transmission speeds. The OLT determines the transmission speed applied to the ONU according to the measured level. Incidentally, the ONU may measure an optical level of a ranging request signal and determine the transmission speed. At a normal operation, when the OLT sends information of plural different transmission speeds to the ONU, a timing when a next frame reaches and transmission speed information are notified to the ONU. Based on the timing, the ONU receives only data of the transmission speed that can be handled. Besides, the OLT switches the transmission speed to receive data based on a grant designation transmitted from the plural ONUs to the OLT.

13 Claims, 22 Drawing Sheets

| ITEM | CONTENT |
|---|---|
| 1 | 11111111 |
| 2 | 00010100 |
| 3 | VID1 |
| 4 | VID2 |
| 5 | VID3 |
| 6 | VID4 |
| 7 | VSSN1 |
| 8 | VSSN2 |
| 9 | VSSN3 |
| 10 | VSSN4 |
| 11 | RRRRRRRR |
| 12 | RRRRAGTT |

← SINCE REGULATION IS REVISED, MESSAGE IDENTIFICATION IS CHANGED (item 2)

← A: IN CASE OF FIXED TRANSMISSION SPEED, [0], IN CASE OF VARIABLE TRANSMISSION SPEED, [1]
G: RESERVED

FIG.4

| ITEM | CONTENT |
|---|---|
| 1 | 11111111 |
| 2 | 00010101 |
| 3 | ONU-ID |
| 4 | Serial number byte 1 |
| 5-10 | ..... |
| 11 | Serial number byte 8 |
| 12 | TRANSMISSION SPEED INSTRUCTION |

← SINCE REGULATION IS REVISED, MESSAGE IDENTIFICATION IS CHANGED

← 1: COMMUNICATION IS PERFORMED AT PRESENT TRANSMISSION SPEED

0: CHANGE COMMUNICATION SPEED AND WAIT FOR RANGING REQUEST SIGNAL

| | DISTANCE | OPTICAL LEVEL | POSSIBLE / IMPOSSIBLE OF SPEED VARIABILITY | TRANSMISSION SPEED AT OPERATION |
|---|---|---|---|---|
| No. 1 | 13km | −15dBm | IMPOSSIBLE | 1G ONU |
| No. 2 | 10km | −10dBm | POSSIBLE | 10G ONU |

⋮

| No. x | 20km | −23dBm | POSSIBLE | 1G ONU |

| | DISTANCE | OPTICAL LEVEL | POSSIBLE / IMPOSSIBLE OF SPEED VARIABILITY | TRANSMISSION SPEED AT OPERATION |
|---|---|---|---|---|
| No. 1 | 5km | −6dBm | IMPOSSIBLE | 10G ONU |
| No. 2 | 10km | −10dBm | POSSIBLE | 10G ONU |
| No. 3 | 7km | −8dBm | IMPOSSIBLE | 10G ONU |

| | ONU NUMBER | TRANSMISSION SPEED AT OPERATION |
|---|---|---|
| No. 1 | #1 | 1G |
| No. 2 | #2 | 1G |

⋮

| No. 32 | #32 | 1G |
| No. 33 | #33 | 10G |
| No. 34 | #34 | 10G |

⋮

| No. 64 | #64 | 10G |

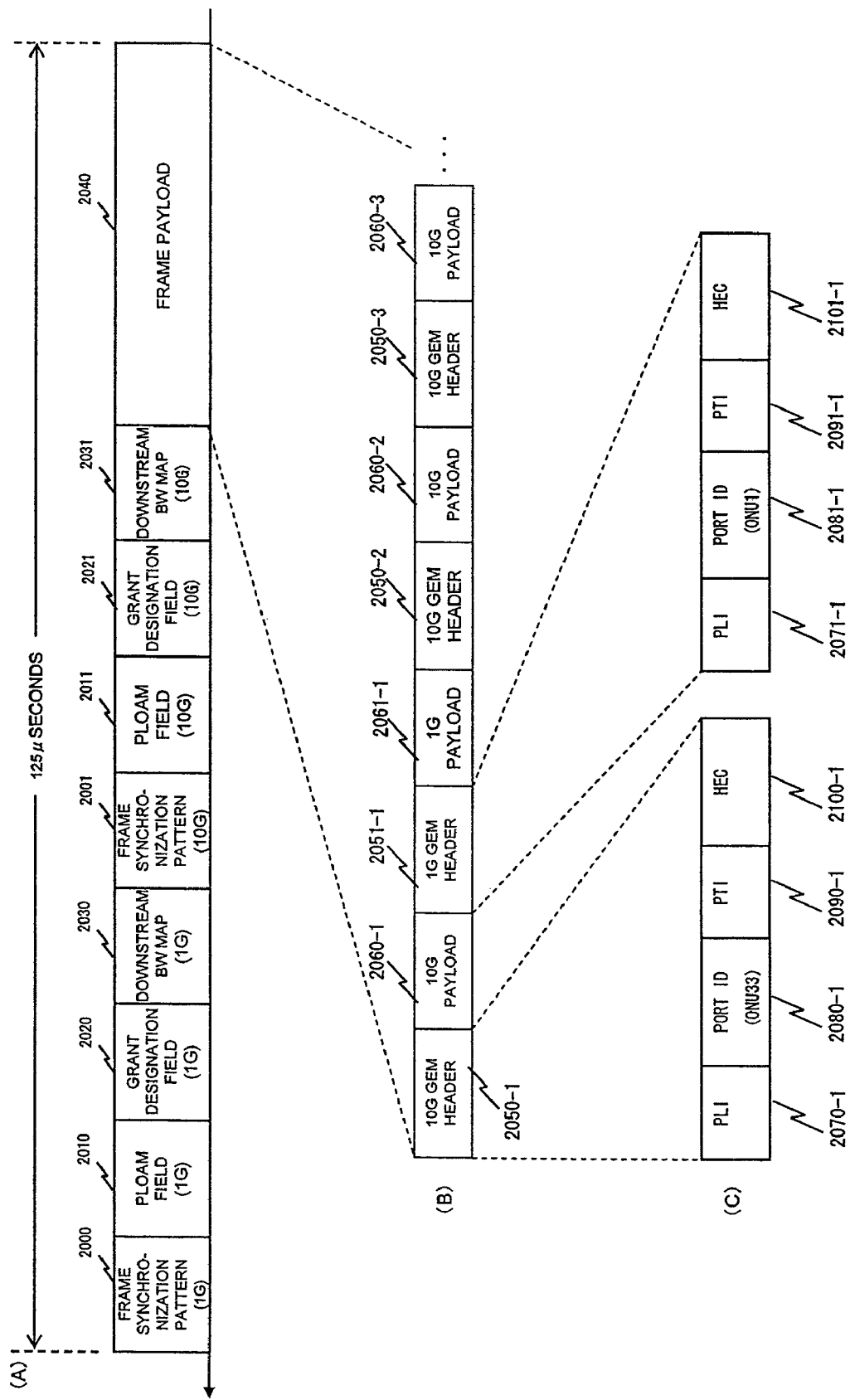

| | ONU NUMBER | START | END | TRANSMISSION SPEED AT OPERATION | REMARKS |
|---|---|---|---|---|---|
| No. 1 | #33 | 310 | 350 | 10G | PRIORITY 1 |
| No. 2 | #1 | 360 | 400 | 1G | PRIORITY 2 |
| No. 3 | #34 | 410 | 450 | 10G | PRIORITY 3 |
| No. 4 | #35 | 460 | 500 | 10G | PRIORITY 4 |

| | ONU NUMBER | START | END | TRANSMISSION SPEED AT OPERATION | REMARKS |
|---|---|---|---|---|---|
| No. 1 | #33 | 11 | 50 | 10G | PRIORITY 1 |
| No. 2 | #1 | 51 | 100 | 1G | PRIORITY 2 |
| No. 3 | #34 | 101 | 150 | 10G | PRIORITY 3 |
| No. 4 | #35 | 151 | 200 | 10G | PRIORITY 4 |

⋮

| No. x-1 | #1~32 | 1 | 5 | 1G | 1G OVERHEAD |
| No. x | #33~64 | 6 | 10 | 10G | 10G OVERHEAD |

| | ONU NUMBER | TRANSMISSION SPEED AT OPERATION |
|---|---|---|
| No. 1 | #1 | 1G |
| No. 2 | #2 | 1G |
| ⋮ | | |
| No. 32 | #32 | 1G |

| | ONU NUMBER | TRANSMISSION SPEED AT OPERATION |
|---|---|---|
| No. 33 | #33 | 10G |
| No. 34 | #34 | 10G |
| ⋮ | | |
| No. 64 | #64 | 10G |

| | ONU NUMBER | TRANSMISSION SPEED AT OPERATION |
|---|---|---|
| No. 1 | #1 | 1G |
| No. 2 | #2 | 1G |
| ⋮ | | |
| No. 32 | #32 | 1G |
| No. 33 | #33 | 10G |
| No. 34 | #34 | 10G |
| ⋮ | | |
| No. 64 | #64 | 10G |

920

PASSIVE OPTICAL NETWORK SYSTEM, OPTICAL LINE TERMINATOR AND OPTICAL NETWORK UNIT

BACKGROUND OF THE INVENTION

1. Field of the Invention

The present invention relates to a passive optical network system, an optical line terminator and an optical network unit, and particularly to a passive optical network system in which plural subscriber connecting equipments share an optical transmission line, an optical line terminator and an optical network unit.

2. Background Art

In order to transmit and receive a large volume of image signals and data through a communication network, speed-up and broadening of the communication network is performed also in an access network for connecting a subscriber to the communication network, and the introduction of a passive optical network system (hereinafter referred to as PON) regulated by Recommendation G.984.1-3 or the like of International Telecommunication Union (hereinafter referred to as ITU-T) is performed. The PON is a system in which an optical line terminator (hereinafter referred to as OLT) connected to an upper communication network and optical network units (hereinafter referred to as ONUs) containing terminals (PC or phone) of plural subscribers are connected to each other through a passive optical network including a trunk optical fiber, an optical splitter and plural branch optical fibers. Specifically, communication is performed in such a mode that signals from terminals (PC etc.) connected to the respective ONUs are sent, as optical signals, from the branch optical fibers to the trunk optical fiber through the optical splitter, are optically (time division) multiplexed on the trunk optical fiber, and are sent to the OLT, and the OLT performs communication processing on the signals from the respective ONUs and sends them to the upper communication network, or sends them to another ONU connected to the OLT.

The development and introduction of the PON starts from a system to handle a low speed signal of, for example, 64 kbit/sec, and the introduction of Broadband PON (BPON) to transmit and receive a fixed length ATM cell at a maximum speed of about 600 Mbit/sec, Ethernet PON (EPON) to transmit and receive a variable length packet of Ethernet at a maximum speed of about 1 Gbit/sec, or Gigabit PON (GPON) which handles a signal of a higher speed of 2.4 Gbit/sec and is standardized by ITU-T Recommendation G.984.1, G.984.2 and 984.3 is advanced. Further, in future, a high speed PON which can handle a signal of 10 Gbit/sec to 40 Gbit/sec is requested to be realized. As means for realizing such high speed PON, multiplexing methods such as Time Division Multiplexing (TDM) to time-division multiplex plural signals, Wavelength Division Multiplexing (WDM) to wavelength-multiplex them, and Code Division Multiplexing (CDM) to code-multiplex them are studied. Incidentally, the present PON adopts the TDM, and for example, the GPON has such a structure that different wavelengths are used between the upstream (from the ONU to the OLT) signal and the downstream (from the OLT to the ONU) signal, and with respect to the communication between the OLT and the respective ONUs, signal communication time is assigned to each ONU. Besides, from the structure of the related art in which fixed length signals are processed, the structure becomes such that burst-like variable length signals (burst signals) in which more various signals (audio, image, data, etc.) are easily handled are also processed. With respect to a future high speed PON, although various multiplexing methods are studied as described above, the study in the direction of adopting the TDM becomes main.

In the mode of each of the PONs, since the ONUs are installed in subscriber homes existing at various places, the distances from the OLT to the respective ONUs are different from each other. That is, since the length (transmission distance) of the optical fiber including the trunk optical fiber and the branch optical fiber from the OLT to each ONU varies, a transmission delay (delay amount) between the OLT and each ONU varies. Thus, even if the respective ONUs transmit signals at different timings, there is a possibility that the optical signals outputted from the respective ONUs collide and interfere with each other on the trunk optical fiber. Thus, in each of the PONs, the distance between the OLT and the ONU is measured by using, for example, the technique called ranging as regulated in Chapter 10 of G.984.3, and the delays of the output signals of the respective ONUs are adjusted so that the signal outputs from the respective ONUs do not collide with each other.

Further, when the OLT determines the bandwidths of signals, which are allowed to be transmitted by the ONUs, based on transmission requests from the respective ONUs by using the technique called dynamic bandwidth assignment (hereinafter referred to as DBA), the delay amounts measured by the ranging are also considered, and the transmission timings are specified for the respective ONUs so that the optical signals from the respective ONUs do not collide and interfere on the trunk optical fiber. That is, the PON is structured such that the operation of communication is performed in the state where the timings of signals transmitted and received between the OLT and the respective ONUs are managed in the system.

In the transmission and reception of signals between the OLT and the respective ONUs, for example, according to the regulation in Chapter 8.3.3 of G.984.2, with respect to a signal from the ONU to the OLT, at the head of the signal from each ONU, a guard time for interference prevention including a maximum of 12 bytes, a preamble used for determination of a signal identification threshold of a receiver in the OLT and for clock extraction, a burst overhead byte called a delimiter to identify a separator between received signals, and a control signal (also called an overhead or a header) of the PON are added to data (also called payload), so that the OLT can identify and process the signals sent from the respective ONUs and multiplexed on the trunk optical fiber. Incidentally, since the respective data are variable length burst data, a header called a G-PON Encapsulation Method (GEM) header for processing the variable length data is also added to the head of each data.

On the other hand, with respect to a signal from the OLT to each ONU, at the head of the signal transmitted from the OLT to each ONU, a frame synchronization pattern to identify the head, a PLOAM field to transmit monitor-maintenance-control information, and an overhead (also called a header) called a grant designation field to instruct signal transmission timing of each ONU are added to data time-division multiplexed for each ONU, so that each ONU can identify and process the signal from the OLT. Incidentally, similarly to the signal from the ONU, a GEM header to process variable length data is added to the data multiplexed for each ONU. The OLT uses the grant designation field and specifies an upstream transmission allowance timing (transmission start (Start) and stop (Stop)) of each ONU for each ONU in units of bytes. The transmission allowance timing is called the grant. When the ONUs transmit data to the OLT at the allowance timing, these are optically (time division) multiplexed on the optical fiber and are received by the OLT.

[Non-patent document 1] ITU-T Recommendation G.984.1

[Non-patent document 2] ITU-T Recommendation G.984.2

[Non-patent document 3] ITU-T Recommendation G.984.3

[Non-patent document 4] ITU-T Recommendation G.984.2 Amendment 1

SUMMARY OF THE INVENTION

In the PON, signals from the OLT to the plural ONUs are time-division multiplexed and are transmitted to all the ONUs. That is, even if the bandwidth (signal amount) of the signal provided to each ONU is small, each ONU once receives all communication signals from the OLT to the respective ONUs, identifies the communication content to its own ONU by using a header (specifically, PORT ID of GEM header for GPON, identifier of ONU called LLID for EPON), captures only the identified signal into the inside of the ONU, and transfers it to the subscriber (user). As described above, in the PON, like the transition from the BPON to the GPON, the development and introduction is advanced from one to process low speed signals to one to process higher speed signals. Although the respective PONs are standardized, and consideration is made to absorb the old PON with respect to the transmission speed of signals, exchange of control signals and the protocol, the compatibility is not completely established, and in the present circumstances, the respective PONs are determined in different forms. Thus, by the expansion of communication service capacity, when it becomes necessary for the ONU to support a speed higher than the transmission speed supported by the related art, it is necessary to adopt (exchange) a new PON in which the transmission speed of the whole PON is increased, for example, the BPON is replaced by the GPON. That is, it is necessary to exchange the OLT and all the ONUs connected to the OLT by new equipments in conformity with the PON in which the transmission capacity is newly expanded.

When the introduction and the use form of the PON, it is conceivable that although needs for provision of higher speed service capacity are increased, all the needs are not instantaneously changed, and partial users start to use, and the users are gradually increased. During this period, there are many subscribers who satisfy the existing PON. As described above, to exchange the existing PON for a new PON is to exchange all the OLT and the ONUs, and a large cost is required for the exchange. Besides, when the substance of the expansion of the communication service capacity is considered, equipments which are not required for a user are also exchanged, and a relatively high cost burden is probably imposed on a carrier who introduces the PON or users who use the PON. Thus, a PON having such a structure that plural PONs different in regulation and performance are mixed and can be operated and its communication method are requested, for example, equipments of a PON different in transmission speed are mutually connected, or a shift to a new PON can be performed while existing equipments of a PON are contained.

Besides, in future, even when a service in which kinds of transmission speeds are expanded is provided, there is conceivable a case where although communication of high speed transmission is performed, transmission and reception of signals becomes impossible due to, for example, the distance between the OLT and the ONU or the loss of a transmission path, and the communication becomes possible only at a lower transmission speed. At that time, it is necessary to allow the user to select a better transmission speed (for example, the highest transmission speed in communicable transmission speeds). In this case, also for the carrier, when only the communication at high speed transmission is performed, there is obtained an effect that it is possible to avoid the demerit that an emission laser having higher transmission power must be used for long distance transmission or for transmission path loss compensation.

In view of the above, it is an object of the invention to provide, in a PON in which PONs with plural specifications (regulations) different in transmission speed are mixed and can be operated, a passive optical network system in which a transmission speed of an ONU capable of transmitting and receiving at plural transmission speeds can be selected, an optical line terminator and an optical network unit. It is another object of the invention to select, with respect to an ONU capable of transmitting and receiving at plural transmission speeds, the best transmission speed based on the reception level of an optical signal and to communicate.

Besides, it is another object of the invention to provide a PON to perform communication of signals between an OLT and respective ONUs in time-division multiplexing, which includes plural ONUs different in signal transmission speed, an ONU capable of transmitting and receiving at plural transmission speeds, and an OLT capable of mixedly containing the ONUs and operating them, and in which a reception level of an optical signal of the ONU capable of receiving at the plural transmission speeds is measured, a transmission speed is selected according to the measured level, and communication is performed between the OLT and the ONU at the plural transmission speeds.

Besides, it is another object of the invention to provide a PON in which even if a demand for expanding communication service capacity, such as improvement of transmission speed, occurs, the exchange cost of communication equipments is suppressed by exchanging only a relevant OLT and a relevant ONU.

A signal to be transmitted and received between the OLT of the PON and each ONU is subjected to a start-up operation such as correction according to the distance as stated above, and then shifts into a service state. That is, in the operation at the start-up, it is not necessary to dare to use a high speed signal. On the other hand, in the service state (normal operation time), since high speed service is provided according to the user's request or contract, a large amount of data is transmitted and received in a short time, and there is also a case where high speed transmission and reception is required.

The PON is operated in the state where the transmission and reception timing of a signal is managed based on the ranging and the technique of DBA. Accordingly, even if data of plural speeds are mixed, those positions (transmission and reception timings) can be grasped and processed. That is, when each ONU can grasp the arrival timing of the transmission speed which can be received by the ONU, or the timing when a frame to the ONU reaches, an error is avoided and the communication can be performed.

In the invention, attention is paid to the characteristic of the PON, and in order to achieve the above object, when plural ONUs different in signal transmission speed are mixed and contained, for example, the best transmission speed of the ONU capable of selecting plural transmission speeds is selected, and the arrival timing of a signal at each ONU for each transmission speed is notified, which are not performed in the related art.

Specifically, before the shift to the normal operation, the optical level is measured between the OLT and the ONU. Based on the result, the transmission speed of the ONU whose transmission speed can be selected is fixed to the best transmission speed. Besides, when frames are transmitted to the respective ONUs corresponding to the respective transmission speeds, the OLT transmits the signals based on previously determined timings. This is similar to the related art in which when frames are transmitted to the OLT from the respective ONUs of the PON, the mutual ONUs transmit the signals based on the grant designations. The timing information is added to the header portion of the signal to each ONU. Specifically, the OLT notifies each ONU of the content of a subsequent frame, that is, timing information (hereinafter referred to as downstream BW (Band Width) map) indicating the timings of low speed and high speed. By this structure, based on the notification, each ONU performs a reception operation at the timing when the frame of the transmission speed which can be handled by its own device reaches, or the timing to the ONU. By this structure, each ONU can receive the objective frame without detecting an error.

More specifically, at the time of ranging, the OLT determines the ONU whose transmission speed can be selected from the received frame in the ranging process. The OLT measures the optical level of the ONU whose transmission speed can be selected, determines the transmission speed of the ONU according to the level, and notifies the ONU. The subsequent communication with the ONU is performed at the determined transmission speed. Besides, as another specific measure, the ONU whose transmission speed can be selected measures the optical level of a signal from the OLT at the time of ranging, determines the transmission speed according to the level by itself, and communicates with the OLT at the transmission speed determined by itself.

Besides, based on the transmission speed information of the respective ONUs collected at the time of ranging, the OLT generates a downstream BW map at the normal operation. With respect to the generation of the downstream BW map, the details will be described hereafter. At the normal operation, the OLT is required to change the transmission speed for each destination to each ONU. At this time, reference is made to the determined transmission speed of each ONU acquired at the time of ranging, and the required speed conversion is performed. Besides, each transmission speed and the timing of data to each ONU are given to the header, so that each ONU avoids the error and can receive the required data. Besides, based on the grant designation given to the header, at the time of reception of signals from the respective ONUs different in transmission speed, the OLT changes a receiver for each transmission speed, so that an error is avoided and the communication is performed.

A passive optical network system is a passive optical network system in which for example, a master station and plural slave stations different in transmission speed are connected by an optical fiber network including an optical splitter, the slave stations include a slave station capable of transmitting and receiving only first data of a first transmission speed, a slave station capable of transmitting and receiving only second data of a second transmission speed higher than the first transmission speed, and a slave station capable of transmitting and receiving the first and the second data of both the first and the second transmission speeds, which are connected to the master station, and the master station includes a measurement circuit capable of determining an optical level of a signal from the slave station, and an adjustment circuit to determine, from measurement of the optical level, the presence or absence of a specific optical level with respect to the slave station capable of transmitting and receiving the plural transmission speeds, and urges the slave station to select a transmission speed based on the determination result.

Besides, the master station further includes an assembling circuit which can obtain transmission speed information of the slave station capable of transmitting and receiving at only the single transmission speed and transmission speed information based on the determination result of the optical level with respect to the slave station capable of transmitting and receiving at the plural transmission speeds.

The master station includes a circuit which, when data of plural mixed transmission speeds are transmitted to the plural slave stations, checks the transmission speed information of the respective slave stations generated by the assembling circuit with destinations of the data from an upper layer of the master station, and generates data reciting arrival timings of the data of the plural transmission speeds at the respective slave stations.

The master station generates the data reciting the arrival timings of the data of the plural transmission speeds at the respective slave stations in the overhead used for control, converts, based on the timing information, the data into the transmission speed which can be received by the slave station, and assembles the time-division multiplexed frame.

The slave station includes an acquisition holding circuit which receives the arrival timing of a next frame for each transmission speed from the overhead portion of the frame when the data of the plural mixed transmission speeds transmitted from the master station are received. Each of the slave stations includes a reception circuit to receive only information of its own transmission speed from the timing information when the next frame reaches. Besides, the slave station capable of transmitting and receiving at the plural transmission speeds includes a switching circuit to switch to the transmission speed specified by the master station.

When receiving the data transmitted from the plural slave stations, the master station refers to the transmission timings from the respective slave stations, estimates the arrival transmission speeds based on the transmission timings, and performs switching.

Besides, a passive optical network system is a passive optical network system in which for example, a master station and plural slave stations different in transmission speed are connected by an optical fiber network including an optical splitter, the slave stations include a slave station capable of transmitting and receiving only first data of a first transmission speed, a slave station capable of transmitting and receiving only second data of a second transmission speed higher than the first transmission speed, and a slave station capable of transmitting and receiving the first and the second data of both the first and the second transmission speeds, which are connected to the master station, and the slave station includes a measurement circuit capable of determining an optical level of a signal from the master station, and a selection circuit that determines, from measurement of the optical level, the presence or absence of a specific optical level with respect to the master station capable of transmitting and receiving the data of the plural transmission speeds, and selects a transmission speed for its own slave station based on a determination result.

According to the first solving means of this invention, there is provided a passive optical network system comprising:

a master station to communicate at a first transmission speed and a second transmission speed higher than the first transmission speed; and a slave station that can communicate with the master station through an optical fiber network at the first and the second transmission speeds, and communicates with the master station at a transmission speed selected from the first and the second transmission speeds, wherein the master station includes:

an optical level detection section to measure an optical level of a signal received from the slave station; and a transmission speed determination section that selects the second transmission speed when the measured optical level is a previously determined threshold or higher, selects the first transmission speed when the measured optical level is lower than the previously determined threshold, and transmits a transmission speed instruction indicating the selected first or second transmission speed to the slave station through the optical fiber network, and wherein the slave station includes a transmission speed switching control unit to set the transmission speed to communicate with the master station at the first or the second transmission speed according to the transmission speed instruction received from the master station.

According to the second solving means of this invention, there is provided a passive optical network system comprising:

a master station to communicate at a first transmission speed and a second transmission speed higher than the first transmission speed;

a plurality of slave stations to communicate with the master station; and an optical fiber network which includes a splitter and in which a signal from the master station is branched by the splitter and is transmitted to the plurality of slave stations, wherein the plurality of slave stations include:

a first slave station that can communicate with the master station at the first and the second transmission speeds, and communicates with the master station at a transmission speed selected from the first and the second transmission speeds; and a second slave station to communicate with the master station at the first or the second transmission speed, wherein the master station includes:

a signal transmission section that transmits a first signal of the first transmission speed to the plurality of slave stations through the optical fiber network, and transmits a second signal of the second transmission speed to the plurality of slave stations through the optical fiber network, an optical level detection section to measure an optical level of a received signal; and a transmission speed determination section to store transmission speed information of the slave stations correspondingly to identifiers of the slave stations, wherein when the transmission speed determination section receives a first response signal from the first slave station that is previously set to one of the first and the second transmission speeds and receives the first or the second signal, the transmission speed determination section selects the second transmission speed when the optical level of the signal measured by the optical level detection section is a previously determined threshold or higher, selects the first transmission speed when the optical level is lower than the threshold, and stores transmission speed information indicating the selected first or second transmission speed correspondingly to the identifier of the first slave station, when the transmission speed determination section receives a second response signal from the second slave station that receives the first or the second signal, the transmission speed determination section stores, correspondingly to the identifier of the second slave station, transmission speed information indicating the transmission speed corresponding to the first or the second signal correspondingly to the identifier of the second slave station, and the master station time-division multiplexes data to the respective slave stations by the first transmission speed and the second transmission speed in accordance with the transmission speed information corresponding to the slave station, and transmits the data.

According to the third solving means of this invention, there is provided a passive optical network system comprising:

a master station to communicate at a first transmission speed and a second transmission speed higher than the first transmission speed; and a slave station that can communicate with the master station through an optical fiber network at the first and the second transmission speeds, and communicates with the master station at a transmission speed selected from the first and the second transmission speeds, wherein the slave station includes:

an optical level detection section to measure an optical level of a signal received from the master station;

a transmission speed determination section that selects the second transmission speed when the measured optical level is a previously determined threshold or higher, selects the first transmission speed when the optical level is lower than the previously determined threshold, and notifies the master station of the selected first or second transmission speed; and a transmission speed switching control section to set the transmission speed to communicate with the master station at the selected first or second transmission speed, and wherein the master station sets the transmission speed to communicate with the slave station in accordance with the notified transmission speed.

According to the forth solving means of this invention, there is provided a passive optical network system comprising:

a master station to communicate at a first transmission speed and a second transmission speed higher than the first transmission speed;

a plurality of slave stations to communicate with the master station; and an optical fiber network which includes a splitter and in which a signal from the master station is branched by the splitter and is transmitted to the plurality of slave stations, wherein the plurality of slave stations include:

a first slave station that can communicate with the master station at the first and the second transmission speeds, and communicates with the master station at a transmission speed selected from the first and the second transmission speeds; and a second slave station to communicate with the master station at the first or the second transmission speed, wherein the master station includes a transmission speed storage section to store transmission speeds of the slave stations correspondingly to identifiers of the plurality of slave stations, wherein the first slave station includes:

an optical level detection section to measure an optical level of a signal received from the master station;

a transmission speed determination section that selects the second transmission speed when the measured optical level is a previously determined threshold or higher, selects the first transmission speed when the optical level is lower than the previously determined threshold, and notifies the master station of the selected first or second transmission speed; and a transmission speed switching control section to set the transmission speed to communicate with the master station at the selected first or second transmission speed, wherein the second slave station notifies the master station that communication is performed at the first or the second transmission speed, and the master station stores transmission speed information indicating the notified transmission speeds into the transmission speed storage section correspondingly to identifiers of the slave stations, and the master station time-division multiplexes data to the respective slave stations by the first transmission speed and the second transmission speed in accordance with the transmission speed information corresponding to the slave stations.

According to the fifth solving means of this invention, there is provided an optical line terminator in a passive optical network system including the optical line terminator that communicates at a first transmission speed and a second transmission speed higher than the first transmission speed, and an optical network unit that can communicate with the optical line terminator at the first and the second transmission speeds through an optical fiber network, and communicates with the optical line terminator at a transmission speed selected from the first and the second transmission speeds, the optical line terminator comprising:

an optical level detection section to measure an optical level of a signal received from the optical network unit; and a transmission speed determination section that selects the second transmission speed when the measured optical level is a previously determined threshold or higher, selects the first transmission speed when the optical level is lower than the previously determined threshold, and transmits a transmission speed instruction indicating the selected first or second transmission speed to the optical network unit through the optical fiber network, wherein the optical line terminator communicates with the optical network unit at the selected first or second transmission speed.

According to the sixth solving means of this invention, there is provided an optical network unit in a passive optical network system including an optical line terminator that communicates at a first transmission speed and a second transmission speed higher than the first transmission speed, and the optical network unit that can communicate with the optical line terminator at the first and the second transmission speeds through an optical fiber network, and communicates with the optical line terminator at a transmission speed selected from the first and the second transmission speeds, the optical network unit comprising:

an optical level detection section to measure an optical level of a signal received from the optical line terminator;

a transmission speed determination section that selects the second transmission speed when the measured optical level is a previously determined threshold or higher, selects the first transmission speed when the optical level is lower than the previously determined threshold, and notifies the optical line terminator of the selected first or second transmission speed; and a transmission speed switching control section to set the transmission speed to communicate with the optical line terminator at the selected first or second transmission speed.

According to the invention, it is possible to provide, in a PON in which PONs with plural specifications (regulations) different in transmission speed are mixed and can be operated, a passive optical network system in which a transmission speed of an ONU capable of transmitting and receiving at plural transmission speeds can be selected, an optical line terminator and an optical network unit. According to the invention, it is possible to select, with respect to an ONU capable of transmitting and receiving at plural transmission speeds, the best transmission speed based on the reception level of an optical signal and to communicate.

Besides, according to the invention, it is possible to provide a PON to perform communication of signals between an OLT and respective ONUs in time-division multiplexing, which includes plural ONUs different in signal transmission speed, an ONU capable of transmitting and receiving at plural transmission speeds, and an OLT capable of mixedly containing the ONUs and operating them, and in which a reception level of an optical signal of the ONU capable of receiving at the plural transmission speeds is measured, a transmission speed is selected according to the measured level, and communication is performed between the OLT and the ONU at the plural transmission speeds.

Besides, according to the invention, it is possible to provide a PON in which even if a demand for expanding communication service capacity, such as improvement of transmission speed, occurs, the exchange cost of communication equipments is suppressed by exchanging only a relevant OLT and a relevant ONU.

BRIEF DESCRIPTION OF THE DRAWINGS

FIG. 4 is a structural view of Serial_Number_ONU_message.

FIG. 5 is a structural view of Assign_ONU-ID message.

FIGS. 6A to 6C are table structural view of respective tables in an ONU transmission speed determination-information storage section.

FIG. 7 is a signal structural view showing a structural example of an optical signal from an OLT to an ONU.

FIG. 10 is a table structural view showing a structural example of a grant designation.

FIG. 12 is a table structural view showing a structural example of a downstream BW map.

FIGS. 20A to 20C are structural view of a table generated by the OLT in the case where optical level detection is performed in the ONU.

DETAILED DESCRIPTION OF THE INVENTION

1. First Embodiment

Hereinafter, a structure and operation of PON in which GPON regulated by ITU-T Recommendation G.984 and next-generation 10G PON expected to be introduced in future and having an increased transmission speed are mixed is used as an example, and the structure and operation of the PON of an embodiment will be described by use of the drawings.

In the following description, the PON is assumed to have a structure in which variable length data similar to the GPON is time-division multiplexed and processed. A description will be made while using an example in which the transmission speed of downstream data from an OLT to each ONU (hereinafter also referred to as downstream) is 1 Gbit/sec (although it is 1.24416 Gbit/sec, hereinafter simplified as 1 Gbit/sec) for GPON, and 10 Gbit/sec (although it is 9.95328 Gbit/sec, hereinafter similarly referred to as 10 Gbit/sec) for 10 GPON. Besides, a description will be made while using an example in which the transmission speed of upstream data from the ONU to the OLT (hereinafter also referred to as upstream) is 1 Gbit/sec (although it is 1.24416 Gbit/sec, hereinafter simplified as 1 Gbit/sec) for GPON, and 5 Gbit/sec (although it is 4.97664 Gbit/sec, hereinafter similarly referred to as 5 Gbit/sec) for 10 GPON. Incidentally, the numerical values of the transmission speed are merely examples, and other transmission speeds may be adopted, and the embodiment is not limited to the numerical values. Besides, three or more transmission speeds may exist for each of the upstream and downstream.

(System Structure)

Figure 1:
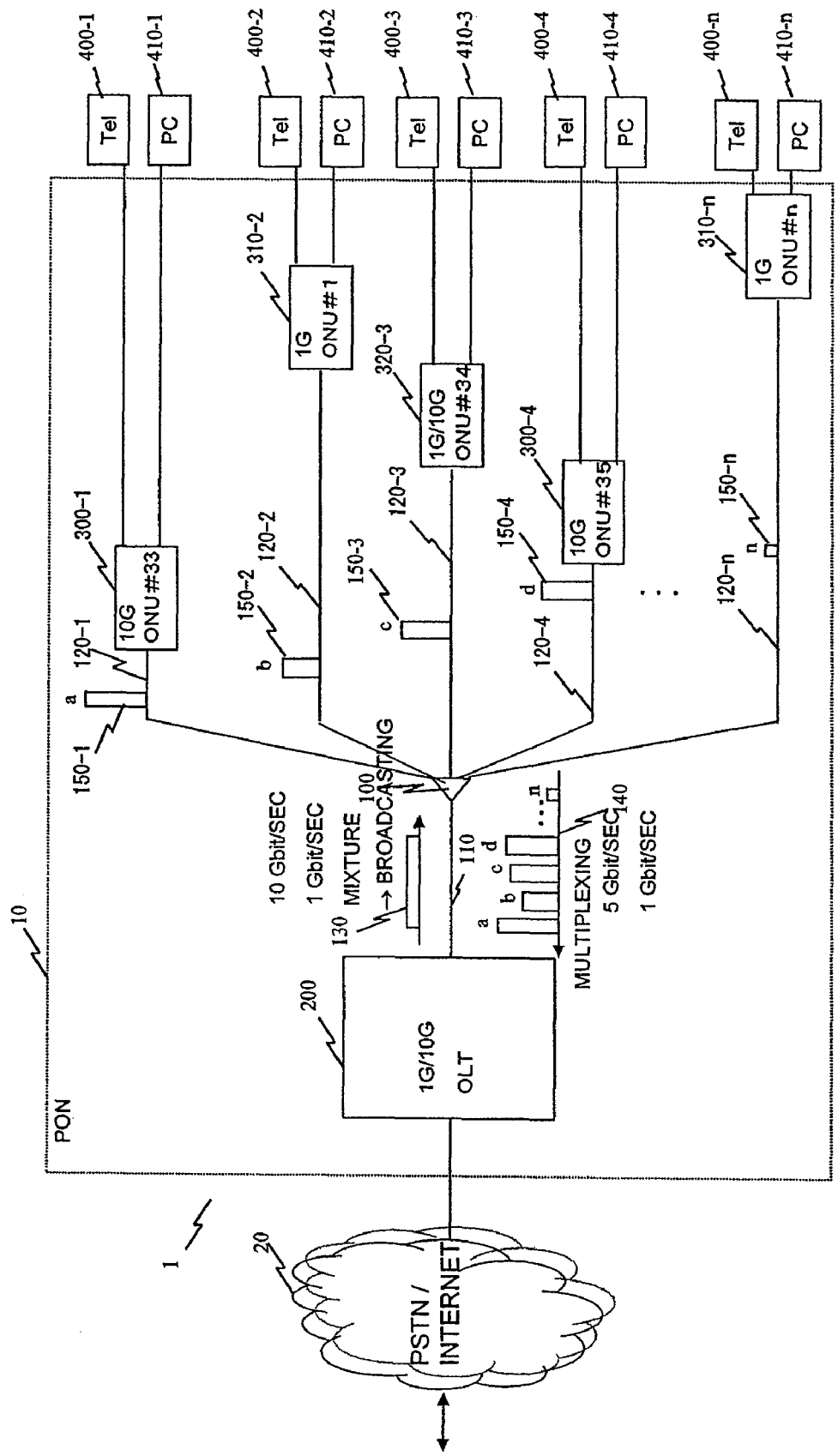
FIG. 1 is a network structural view showing a structural example of an optical access network using a PON.

FIG. 1 is a network structural view showing an example of an optical access network using a PON.

An access network 1 is a network in which for example, a public communication network (PSTN)/Internet 20 (hereinafter, also called an upper network) as an upper communication network and a subscriber terminal (Tel: 400, PC: 410, etc.) are connected through a PON 10 and communication is performed. The PON 10 includes an OLT (hereinafter also called a master station) 200 connected to the upper network 20, and plural ONUs (hereinafter also called slave stations) 300, 310 and 320 containing subscriber's terminals (telephone (Tel) 400, PC 410, etc.). The OLT 200 and the respective ONUs 300, 310 and 320 are connected through a passive optical network including a trunk optical fiber 110, an optical splitter 100 and plural branch optical fibers 120, and communication between the upper network 20 and the subscriber terminals 400 and 410, or between the subscriber terminals 400 and 410 is performed.

The ONU 300 is, for example, the ONU (hereinafter also called 10G ONU) of 10 GPON (downstream is 10 Gbit/sec), and the ONU 310 is, for example, the ONU (hereinafter also called 1G ONU) of GPON (downstream is 1 Gbit/sec). Besides, the ONU 320 is, for example, the ONU of both 10G PON and GPON (for example, with respect to the downstream, ONU capable of receiving both 10 Gbit/sec and 1 Gbit/sec, and hereinafter also called 1G/10G ONU). In accordance with the present Recommendation G.984, even in the case where the three types of ONUs are mixed, up to 64 ONUs 300/310/320 can be respectively connected to the OLT 200. In the example of FIG. 1, the five ONUs 300, 310 or 320 are illustrated. ONU#33 (300-1) and ONU#35 (300-4) of 10G capable of receiving data at transmission speed of downstream data signal of 10 Gbit/sec, ONU#1 (310-2) and ONU#n (310-n) of 1G capable of receiving data at transmission speed of downstream data signal of 1 Gbit/sec, and 1G/10G ONU#34 (320-3) capable of receiving data at both transmission speeds of downstream data signal of 1 Gbit/sec and 10 Gbit/sec are mixed and connected to the OLT 200. Incidentally, the number of ONUs connected to the OLT 200 and the maximum connectable number may be a suitable number.

Although the details will be described later, with respect to a downstream signal 130 transmitted from the OLT 200 to the respective ONUs 300/310/320, signals to the respective ONUs 300/310/320 are time-division multiplexed and are broadcasted. For example, the ONU 300/310/320 determines whether the reached frame has its own transmission speed, or is the signal to itself, and receives the signal. The ONU 300/310/320 sends the received signal to the telephone 400 or the PC 410 based on the destination of the signal. Besides, an upstream signal 140 transmitted from the respective ONUs 300/310/320 to the OLT 200 is the optically multiplexed signal 140 obtained by optically time-division multiplexing an upstream signal 150-1 transmitted from the ONU 300-1, an upstream signal 150-2 transmitted from the ONU 310-2, an upstream signal 150-3 transmitted from the ONU 320-3, an upstream signal 150-4 transmitted from the ONU 300-4, and a signal 150-n transmitted from the ONU 310-n through the optical splitter 100, and is transmitted to the OLT 200. Incidentally, since fiber lengths between the OLT 200 and the respective ONUs 300/310/320 are different from each other, the signal 140 has a form in which signals different in amplitude are multiplexed.

Incidentally, an optical signal of, for example, a wavelength band of 1.5 μm is used as the downstream signal, an optical signal of, for example, a wavelength band 1.3 μm is used as the upstream signal 140, 150, and both the optical signals are wavelength multiplexed (WDM) and transmitted and received through the same optical fibers 110 and 120.

Figure 9:
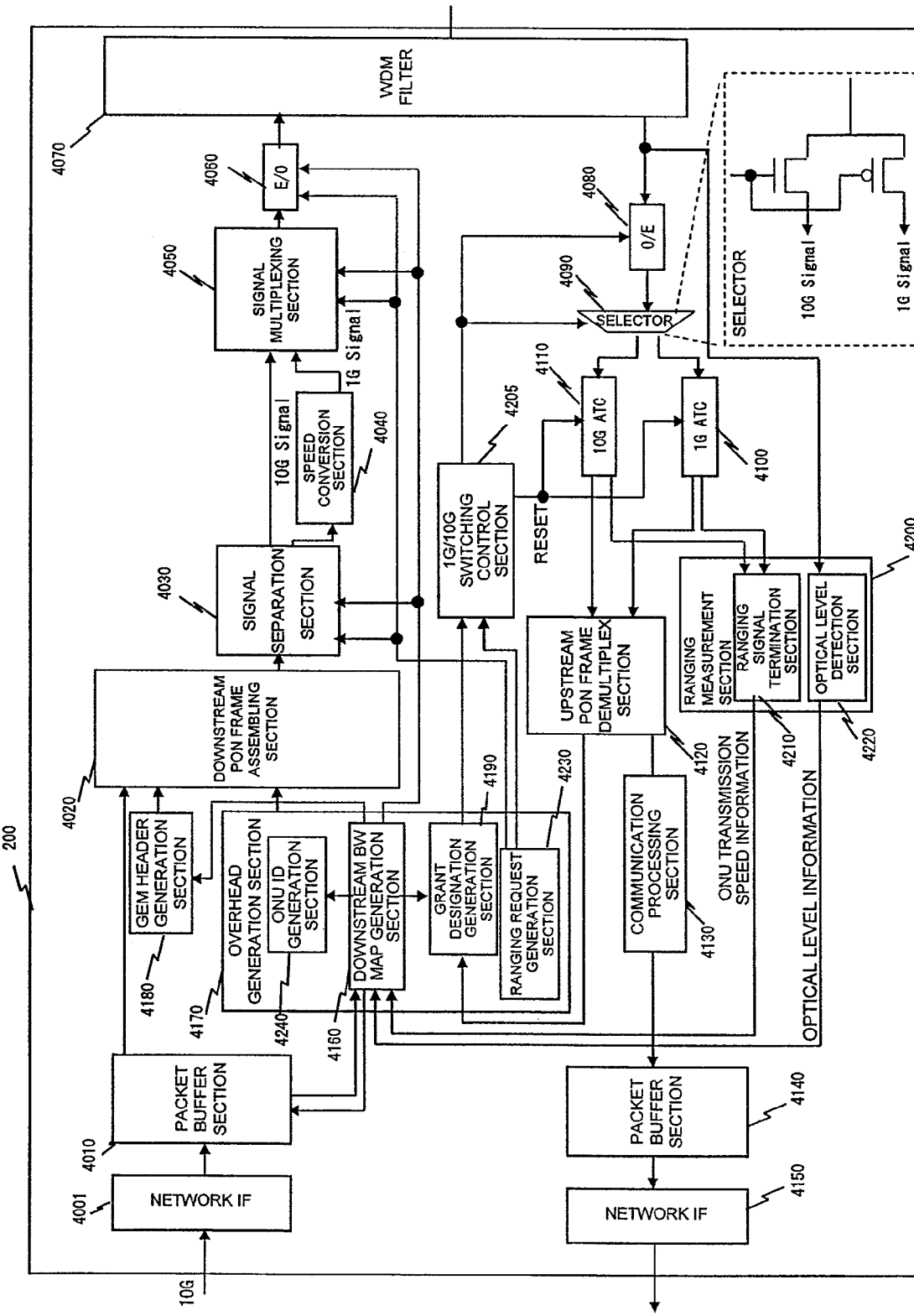
FIG. 9 is a block diagram showing a structural example of a 1G/10G OLT.

FIG. 9 is a block diagram showing a structural example of the OLT 200.

The OLT 200 includes, for example, a network IF 4001, a packet buffer section 4010, a GEM header generation section 4180, an overhead generation section 4170, a down PON frame assembling section 4020, a signal division section 4030, a speed conversion section 4040, a signal multiplexing section 4050, an E/O 4060, a WDM filter 4070, an O/E 4080, a selector 4090, a ranging measurement section 4200, a 1G ATC 4100, a 10G ATC 4110, an upstream PON frame demultiplex section 4120, a communication processing section 4130, a 1G/10G switching control section 4205, a packet buffer section 4140, and a network I/F 4150.

The overhead generation section 4170 includes, for example, an ONU ID generation section 4240, a downstream BW map generation section 4160, a grant designation generation section 4190, and a ranging request generation section 4230. The ranging measurement section 4200 includes, for example, a ranging signal termination section 4210 and an optical level detection section 4220. Incidentally, the function and operation of the respective sections will be described later in detail.

Figure 11:
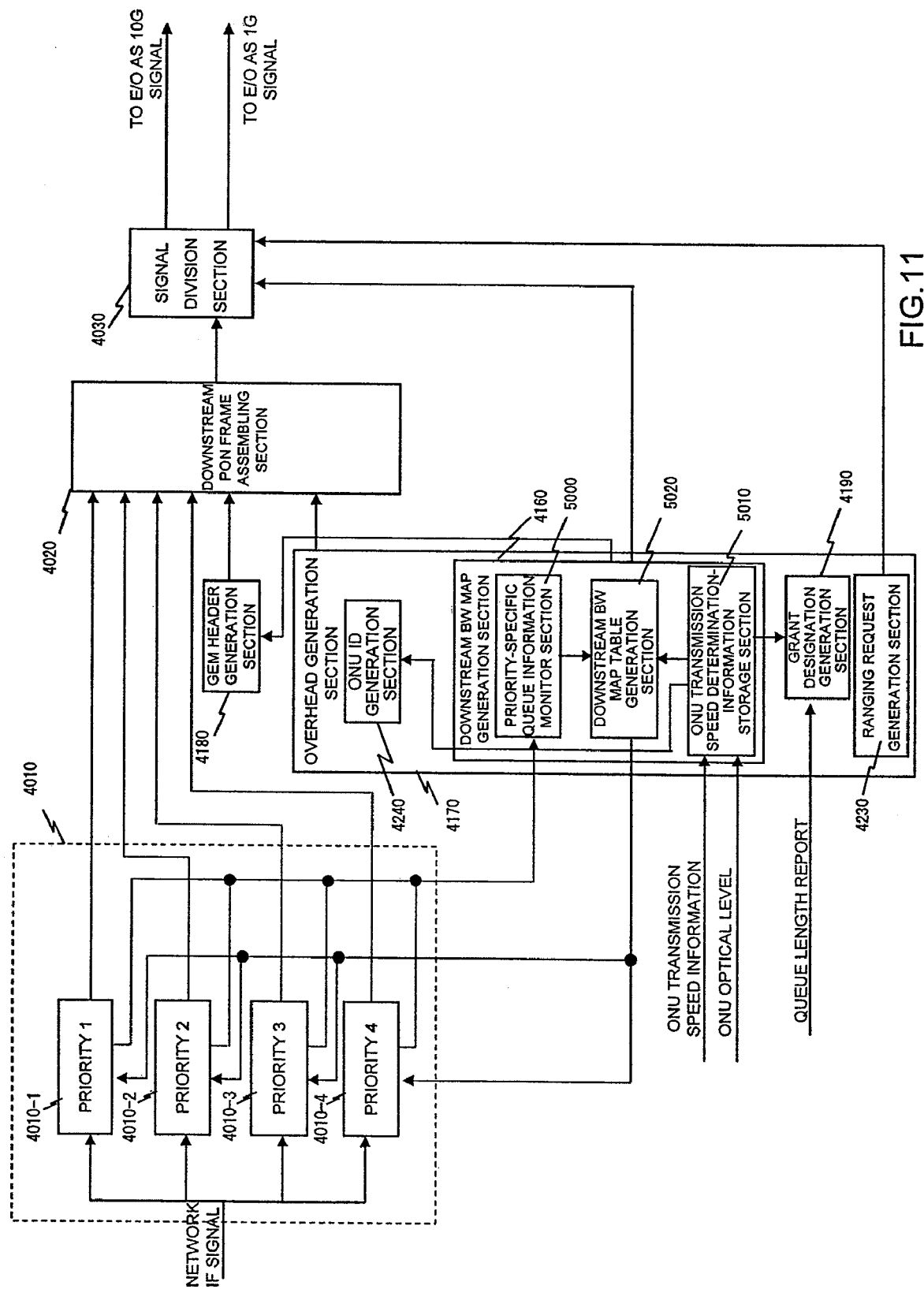
FIG. 11 is a structural view showing a downstream BW map generation section, and an ONU transmission speed determination-information storage section.

FIG. 11 is a detailed structural view of the downstream BW map generation section 4160 and the packet buffer section 4010.

The downstream BW map generation section 4160 includes, for example, a priority-specific queue information monitor section 5000, a downstream BW map table generation section 5020, and an ONU transmission speed determination-information storage section 5010. The packet buffer section 4010 includes queue buffers for each priority. For example, the packet buffer includes a queue buffer 4010-1 of priority 1, a queue buffer 4010-2 of priority 2, a queue buffer 4010-3 of priority 3, and a queue buffer 4010-4 of priority 4. Incidentally, the number of queue buffers, and the number of priorities may be a suitable number. The function and operation of the respective sections will be described later in detail.

Figure 13:
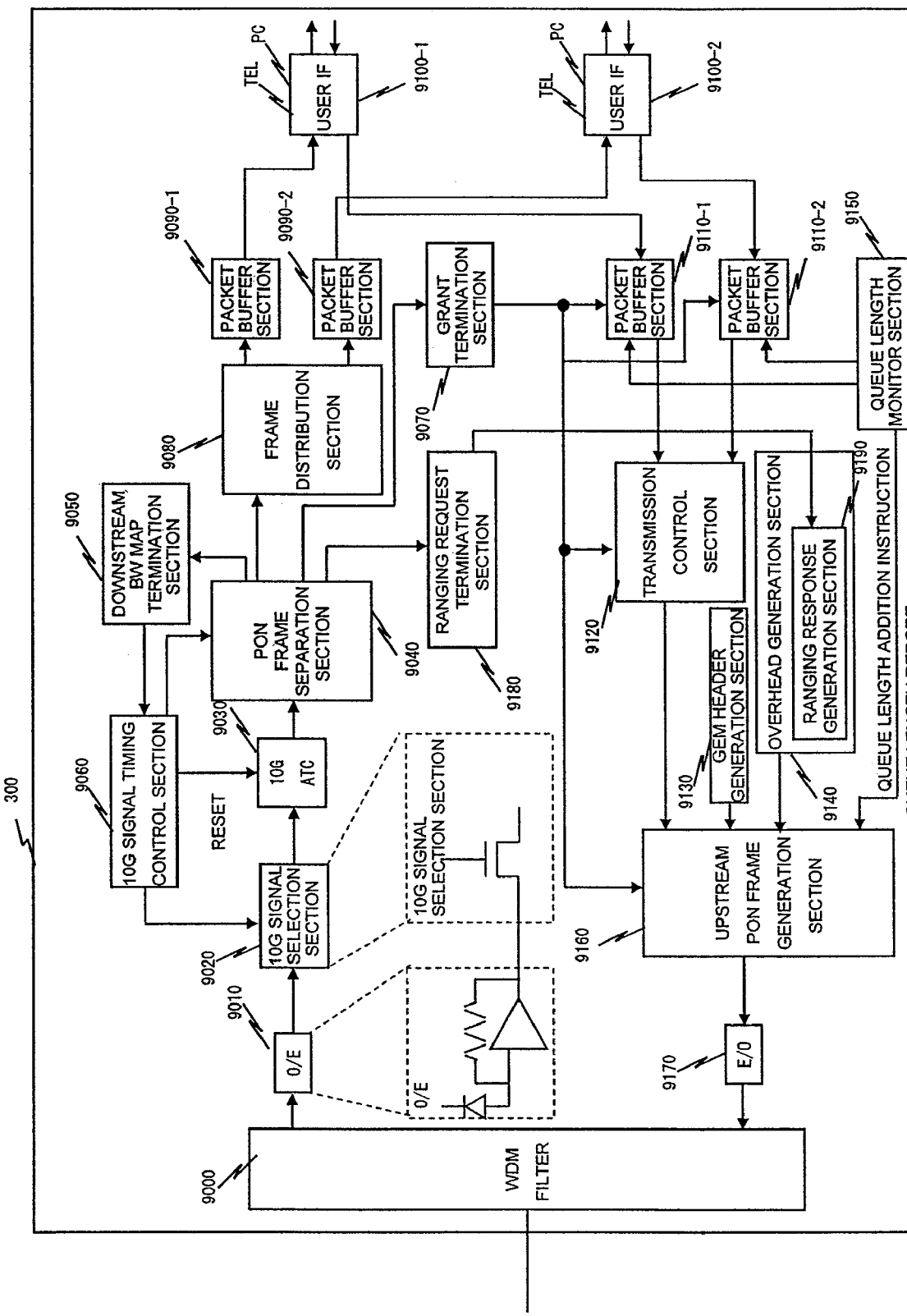
FIG. 13 is a block diagram showing a structural example of a 10G ONU.

FIG. 13 is a block diagram showing a structural example of the ONU 300.

The 10G ONU 300 includes, for example, a WDM filter 9000, an O/E 9010, a 10G signal selection section 9020, a 10G ATC 9030, a PON frame separation section 9040, a downstream BW map termination section 9050, a 10G signal timing control section 9060, a frame distribution section 9080, packet buffer sections 9090, 9110, user I/Fs 9100, a grant termination section 9070, a ranging request termination section 9180, a GEM header generation section 9130, an overhead generation section 9140, a queue length monitor section 9150, a transmission control section 9120, an upstream PON frame generation section 9160, and an E/O 9170. The overhead generation section 9140 includes a ranging response generation section 9190. The number of the packet buffer sections 9090, 9110 and the user IFs 9100 may be arbitrary. Incidentally, the function and operation of the respective sections will be described later in detail.

Figure 14:
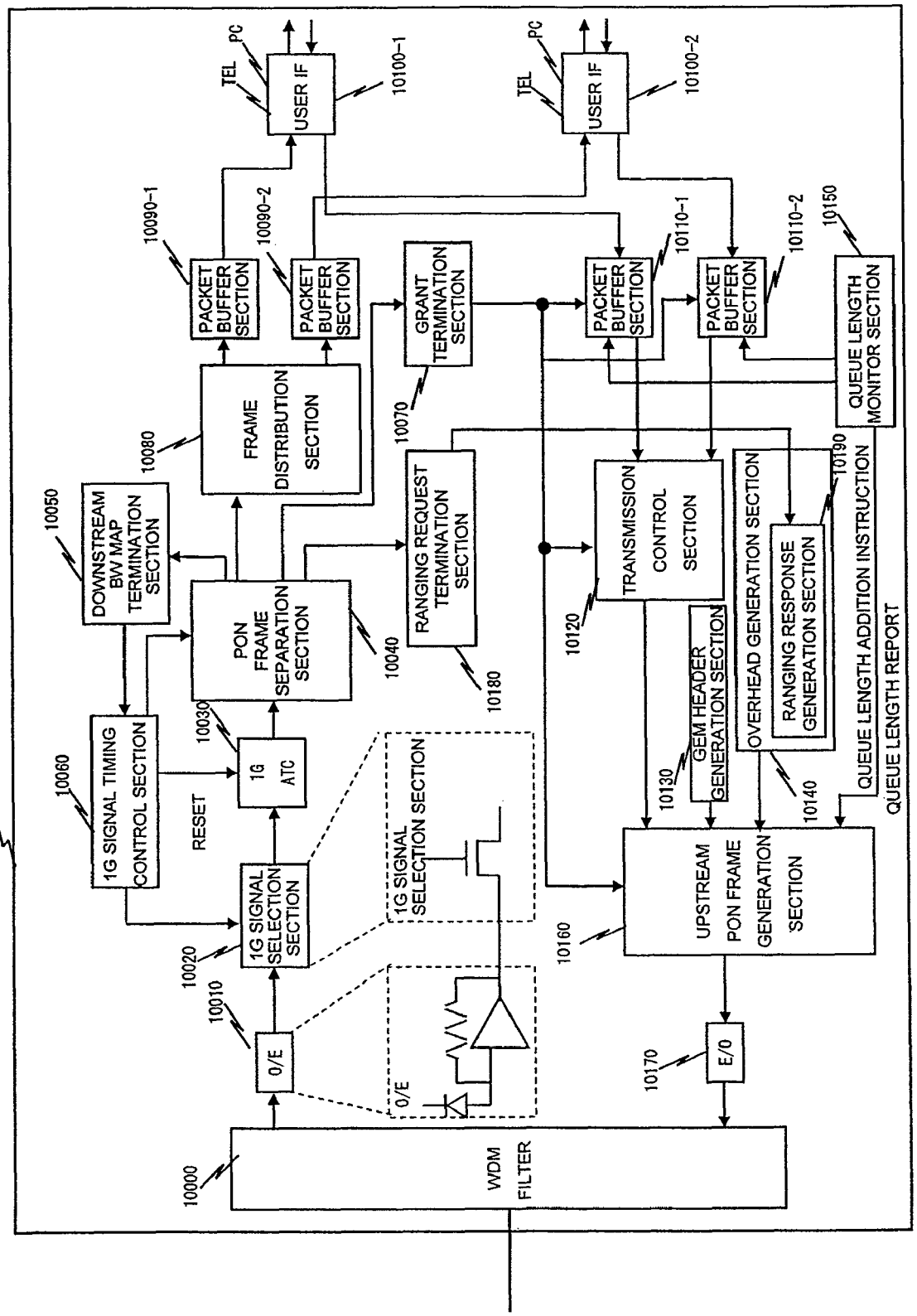
FIG. 14 is a block diagram showing a structural example of a 1G ONU.

FIG. 14 is a block diagram showing a structural example of the 1G ONU 310.

Since the structure and function of each block is equal to that of the 10G ONU 300 except for the transmission speed, the detailed description thereof will be omitted.

Figure 15:
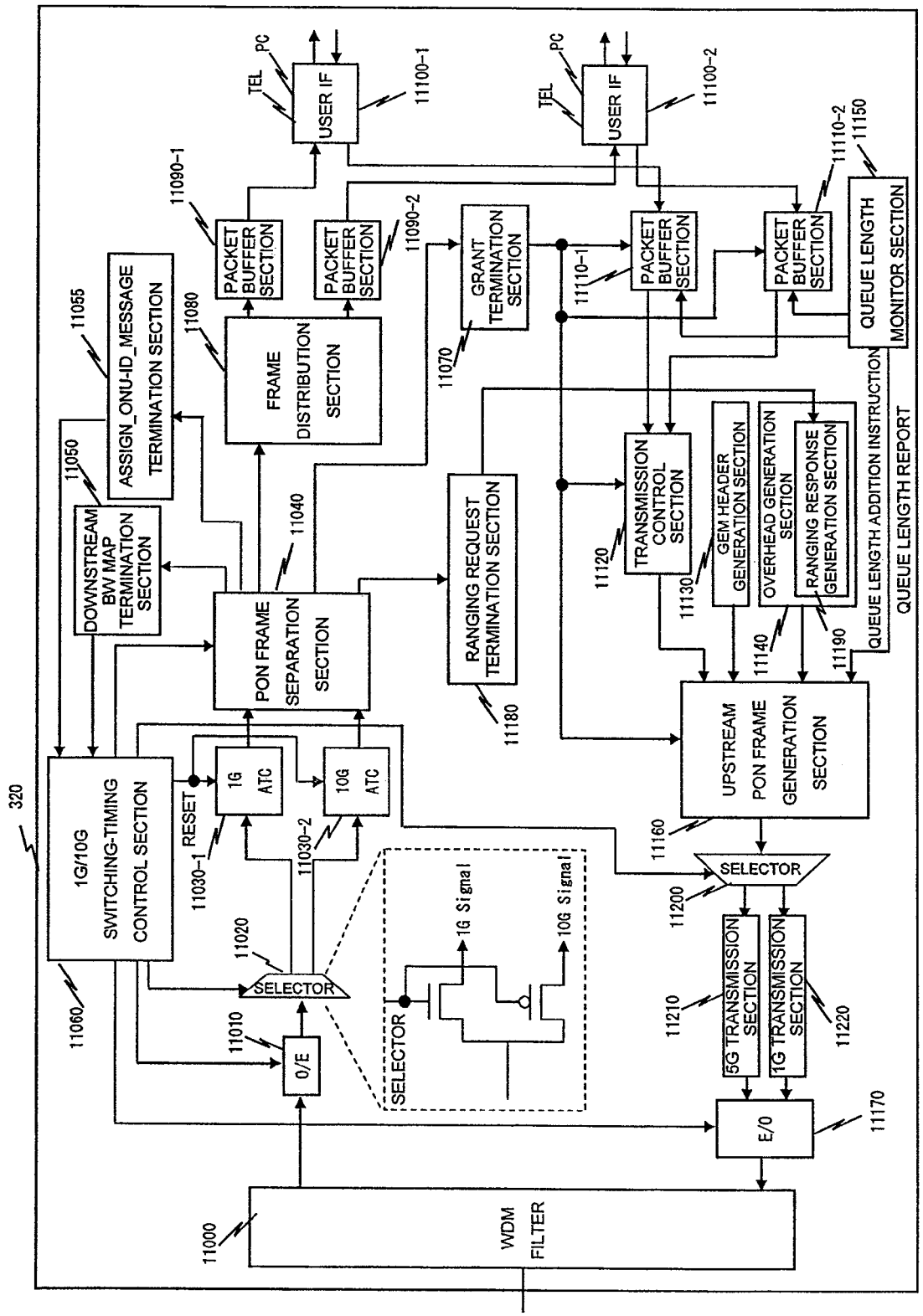
FIG. 15 is a block diagram showing a structural example of a 1G/10G ONU.

FIG. 15 is a block diagram of the 1G/10G ONU 320.

The 1G/10G ONU 320 includes, for example, a WDM filter 11000, an O/E 11010, a selector 11020, a 1G ATC 11030-1, a 10G ATC 11030-2, a PON frame separation section 11040, a downstream BW map termination section 11050, an Assign_ONU-ID_message termination section 11055, a 1G/10G switching-timing control section 11060, a frame distribution section 11080, packet buffer sections 11090, 11110, user I/Fs 11100, a grant termination section 11070, a ranging request termination section 11180, a GEM header generation section 11130, an overhead generation section 11140, a queue length monitor section 11150, a transmission control section 11120, an upstream PON frame generation section 11160, a selector 11200, a 5G transmission section 11210, a 1G transmission section 11220, and an E/O 11170. The number of the packet buffer sections 11090, 11110 and the user IFs 11100 may be arbitrary.

The overhead generation section 11140 includes a ranging response generation section 11190. The selector 11020 outputs a signal from the O/E 11010 to one of the 1G ATC 11030-1 and the 10G ATC 11030-2. The 1G/10G switching-timing control section 11060 switches between the O/E 11010 and the selector 11020 according to the transmission speed. The selector 11200 outputs a signal from the upstream PON frame generation section 11160 to one of the 5G transmission section 11210 and the 1G transmission section 11220. The 1G/10G switching-timing control section 11060 switches between the E/O 11170 and the selector 11200 according to the transmission speed. The Assign_ONU-ID_ message termination section 11055 receives Assign_ONU-ID_message in an after-described ranging process, and determines the corresponding speed of its own ONU. Incidentally, the details will be described in the description of an operation at the after-described ranging process.

Besides, with respect to a downstream signal, when the signal is inputted to the 1G ATC 11030-1 by the selector 11020, the ONU 320 performs the same function as the 1G ONU 310, and when the signal is inputted to the 10G ATC 11030-2, the ONU 320 performs the same function as the 10G ONU 300. Also with respect to an upstream signal, the signal is selected by the selector 11200, and the same function as the ONU 310 or 320 is performed.

Next, an optical signal (downstream signal) from the OLT 200 to the ONUs 300/310/320 and an optical signal (upstream signal) from the ONUs 300/310/320 to the OLT 200 will be described. Although the structure of the optical signal of the 10G PON is not yet regulated for the present, since both the GPON and the 10G PON handle variable length data, it is conceivable that one of realistic (practical) plans is that signals of the respective speeds are processed by time-division multiplexing using the same signal structure as the GPON regulated by Recommendation at present. Accordingly, in this embodiment, the operation of the PON will be described on the basis of the signal structure regulated in the GPON. Incidentally, a suitable signal structure may be used. Of course, the signal structure and the operation of the PON are merely examples, and the embodiment is not limited to the structure and operation. Besides, it is assumed that the ONU 320 operates as the ONU of 10G PON.

FIG. 7 is a signal structural view of an optical signal from the OLT 200 to the respective ONUs 300/310/320.

The signal from the OLT 200 to the respective ONUs 300/310/320 is called the downstream signal 130. For example, as shown in FIG. 7(A), the downstream signal 130 is a frame of 125µ second, and includes an overhead and a frame payload 2040. The overhead includes frame synchronization patterns 2000/2001 used for the respective ONUs 300/310/320 to find the head of the signal, PLOAM fields 2010/2011 to transmit information relating to monitor-maintenance-control to the respective ONUs 300/310/320, grant designation fields 2020/2021 to specify upstream signal transmission timings from the respective ONUs 300/310/320 to the OLT 200, and downstream BW maps 2030/2031 indicating timing of a next arrival frame for each transmission speed in the frame payload of mixture of different transmission speeds. In the frame payload 2040, data to the respective ONUs 300/310/320 is time-division multiplexed. Incidentally, the overhead includes a 1G overhead and a 10G overhead. The downstream signal 130 is broadcasted to the respective ONUs 300/310/320. The respective ONUs 300/310/320 determine, from the overhead, the timing when the received signal of the corresponding transmission speed reaches, or whether the received signal is the signal for its own ONU, and perform various operations corresponding to the overhead described below or transmit the received data to the destination terminal 400, 410.

FIG. 7(B) is a structural view showing a detailed structure of the frame payload 2040.

Data (10G payload 2060, 1G payload 2061) to the respective ONUs 300/310/320 is time-division multiplexed in the inside of the frame payload 2040 in the form that for example, data identifiers for the respective ONUs, GEM headers (10G GEM header 2050, 1G GEM header 2051) used for data reception in the respective ONUs 300/310/320 are added. FIG. 7(C) is a structural view showing a structure of the GEM headers 2050/2051. Since the details of the respective bytes are regulated by Recommendations G.984, the description thereof will be omitted.

Figure 8:
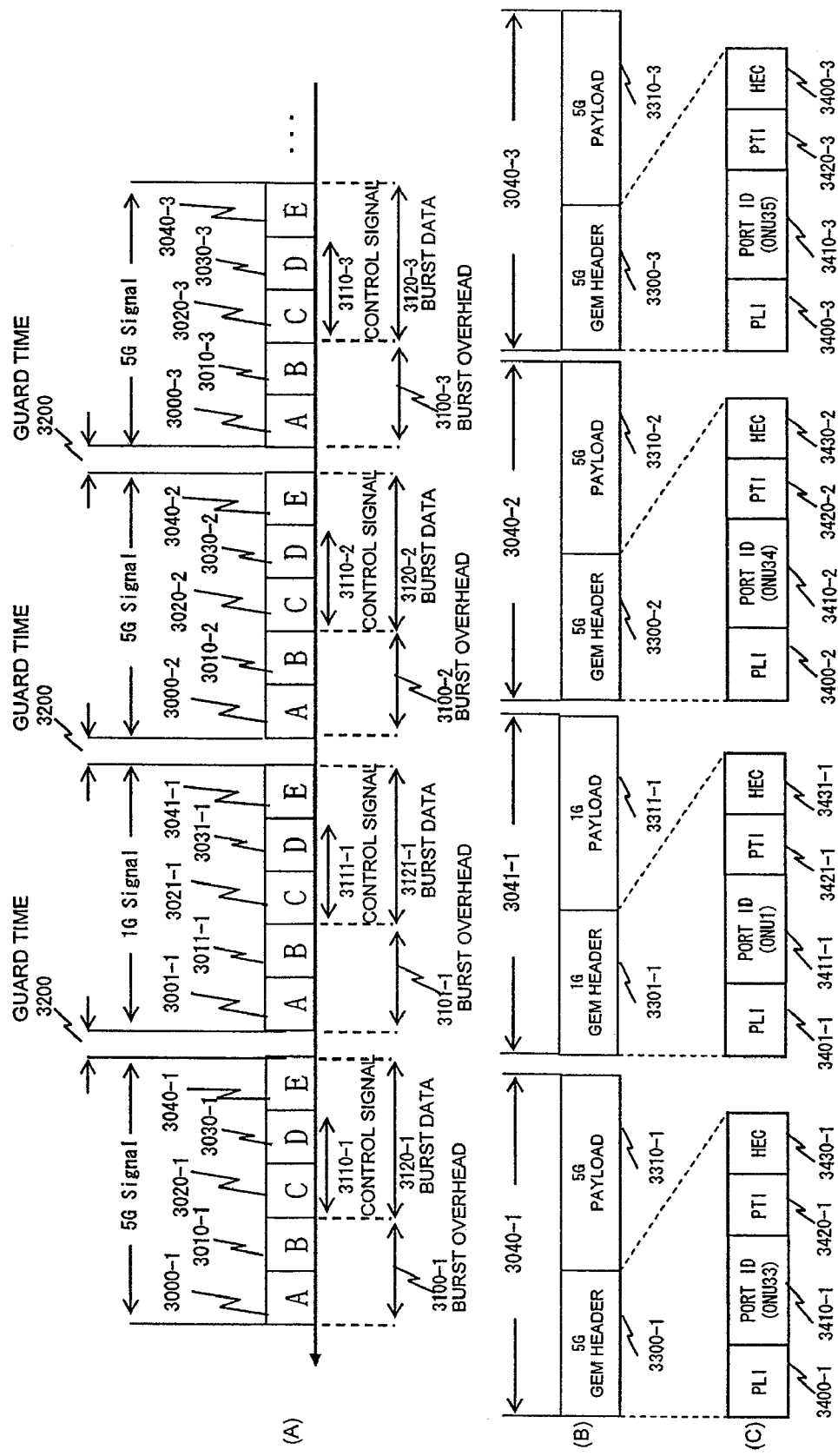
FIG. 8 is a signal structural view showing a structural example of an optical signal from the ONU to the OLT.

FIG. 8 is a signal structural view of an optical signal from the respective ONUs 300/310/320 to the OLT 200.

The signal from the respective ONUs 300/310/320 to the OLT 200 is called the upstream signal 150. For example, as shown in FIG. 8(A), the upstream signal 150 includes burst overheads 3100/3101 and burst data 3120/3121. The burst data 3120/3121 include control signals 3110/3111 having PLOAM fields 3020/3021 to transmit information relating to monitor-maintenance-control of the respective ONUs 300/310/320 and queue length fields 3030/3031 to notify the OLT 200 of the amount of data whose transmission is waited by the respective ONUs 300/310/320, and variable length frame payloads 3040/3041 in which data from the terminal 400, 410 of the ONU is stored. The burst overheads 3100/3101 include preamble fields 3000/3001 used for the OLT 200 to recognize and process the burst data 3120/3121 from the respective ONUs 300/310/320 and delimiter fields 3010/3011. Incidentally, a guide time 3200 shown before the preamble field 3000/3001 is a non-signal (optical signal OFF state) field for separating transmission signals from the respective ONUs. For example, in Recommendation G.984, the total of the guard time 3200 and the burst overhead 3100/3101 is regulated to have a maximum of 12 bytes. The signal from the respective ONUs 300/310/320 is time-division multiplexed on the trunk optical fiber 110 after passing through the optical splitter 100, becomes the multiplexed optical signal 140, and is transmitted to the OLT 200.

FIG. 8(B) is a structural view showing a detailed structure of the frame payloads 3040/3041. Similarly to the downstream signal 130, data (5G payload 3310, 1G payload 3311) from the respective ONUs 300/310/320 are added with GEM headers 3300/3301 used for data reception in the OLT 200, such as data identifiers for the respective ONUs, and are time-division multiplexed in the inside of the frame payloads 3040/3041.

FIG. 8(C) is a structural view of the GEM headers 3300/3301. Since the details of the respective bytes are regulated in Recommendation G.984, the description thereof will be omitted.

FIG. 6 is a structural view of a transmission speed determination result table of the respective ONUs 300/310/320 stored in the ONU transmission speed determination-information storage section 5010.

Transmission speed determination result tables 600, 610 stores, for the respective ONUs 300/310/320, distance information between the OLT 200 and the ONU, optical level information of a signal received by the OLT 200, speed variability possible/impossible information indicating whether the ONU can select speed, and transmission speed information at the time of operation determined by the OLT 200. FIG. 6A is an example in the case where the after-described ranging process is performed at a transmission speed of 1 Gbit/sec. As an example, the respective information on the ONU 310-2 of FIG. 1 is stored in an entry of No. 1 of FIG. 6A, and the respective information on the ONU 320-3 is stored in an entry of No. 2.

FIG. 6B shows a table in the case where the ranging process is performed at a transmission speed of 10 Gbit/sec. As an example, the respective information on the ONU 300-1 of FIG. 1 is stored in an entry of No. 1 of FIG. 6B, the respective information on the ONU 320-3 is stored in an entry of No. 2, and the respective information on the ONU 300-4 is stored in an entry of No. 3.

FIG. 6C is a structural view of an ONU ID transmission speed correspondence table 620.

In the ONU ID transmission speed correspondence table 620, for example, transmission speed information at the time of operation determined by the OLT 200 is stored correspondingly to the ONU IDs of the respective ONUs 300/310/320. As the ONU ID, for example, an ONU number can be used, however, suitable identification information such as a character may be used. The respective information is stored in the ranging process based on the information of the transmission speed determination result tables 600 and 610.

FIG. 10 is a structural view of a grant designation table 700.

The grant designation table 700 stores, for example, transmission allowance timing information of the respective ONUs 300/310/320, and transmission speed information at the time of operation correspondingly to the ONU IDs of the respective ONUs 300/310/320. The transmission allowance timing information includes, for example, a start timing (Start) when transmission is allowed and an end timing (End).

FIG. 12 is a structural view of a downstream BW map 800.

The downstream BW map 800 stores, for example, transmission speed information at the time of operation of the respective ONUs 300/310/320 and arrival timing information (Start, End) of frames to the respective ONUs 300/310/320 correspondingly to the ONU IDs of the respective ONUs 300/310/320. The transmission speed information corresponding to the respective ONUs 300/310/320 is stored based on the ONU ID transmission speed correspondence table 620, and the arrival timing information of frames to the respective ONUs 300/310/320 is generated based on the respective destinations of next frames and information amount stored in the packet buffer section 4010.

(Operation at Start-Up)

Figure 2A:
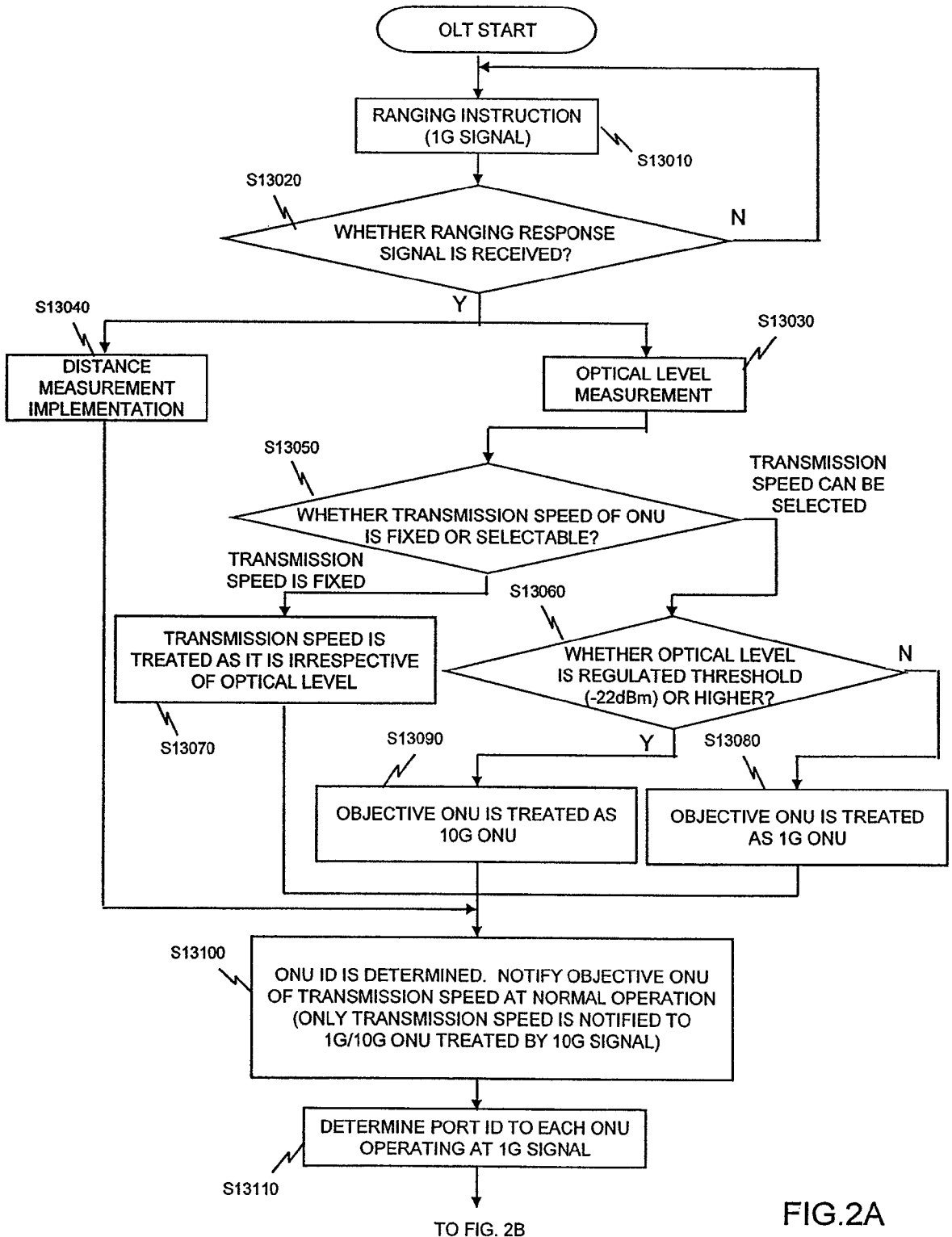
FIG. 2A is a flowchart 1 showing a flow of an OLT operation at the time of ranging.
Figure 2B:
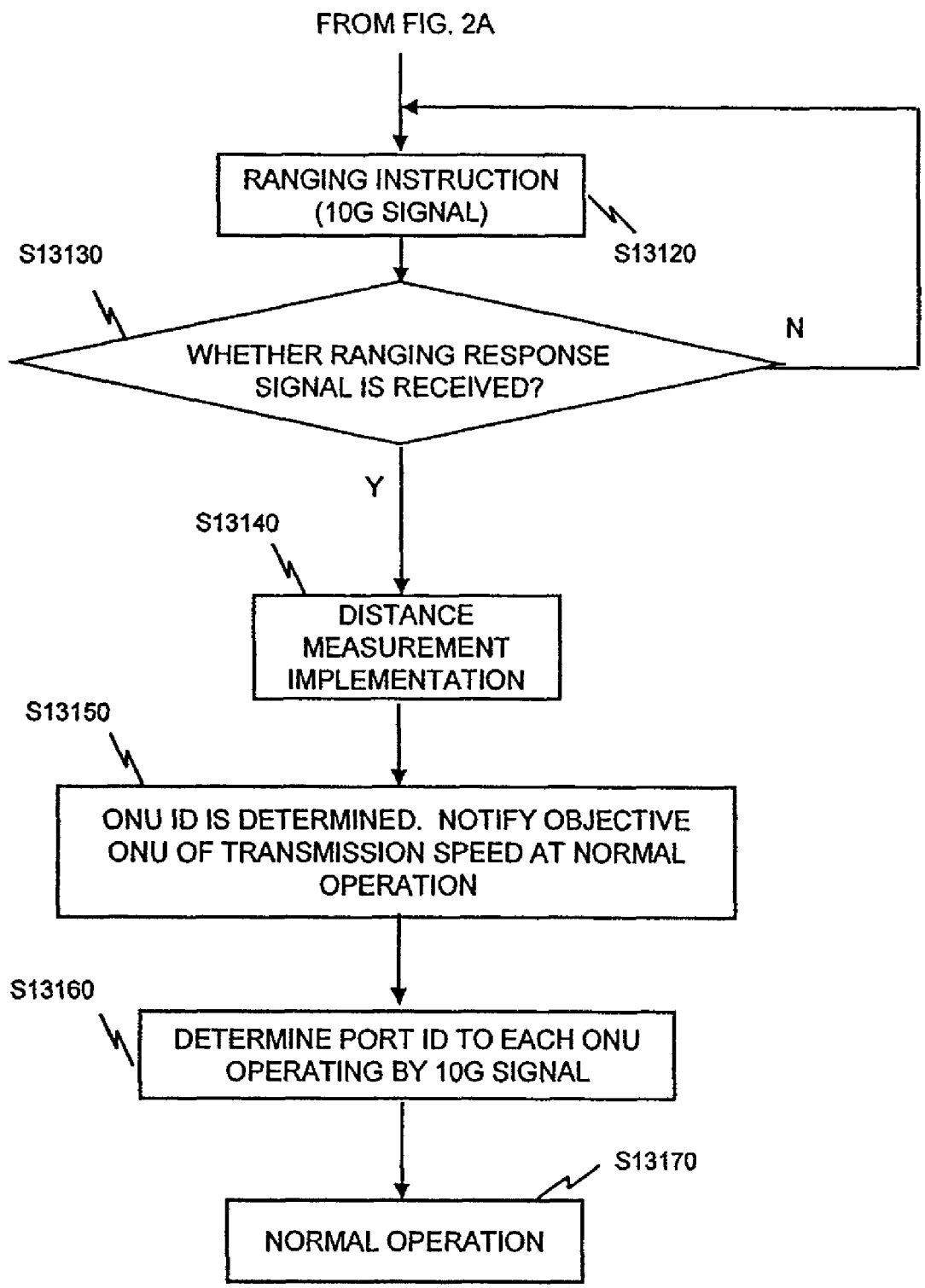
FIG. 2B is a flowchart 2 showing the flow of the OLT operation at the time of ranging.
Figure 3A:
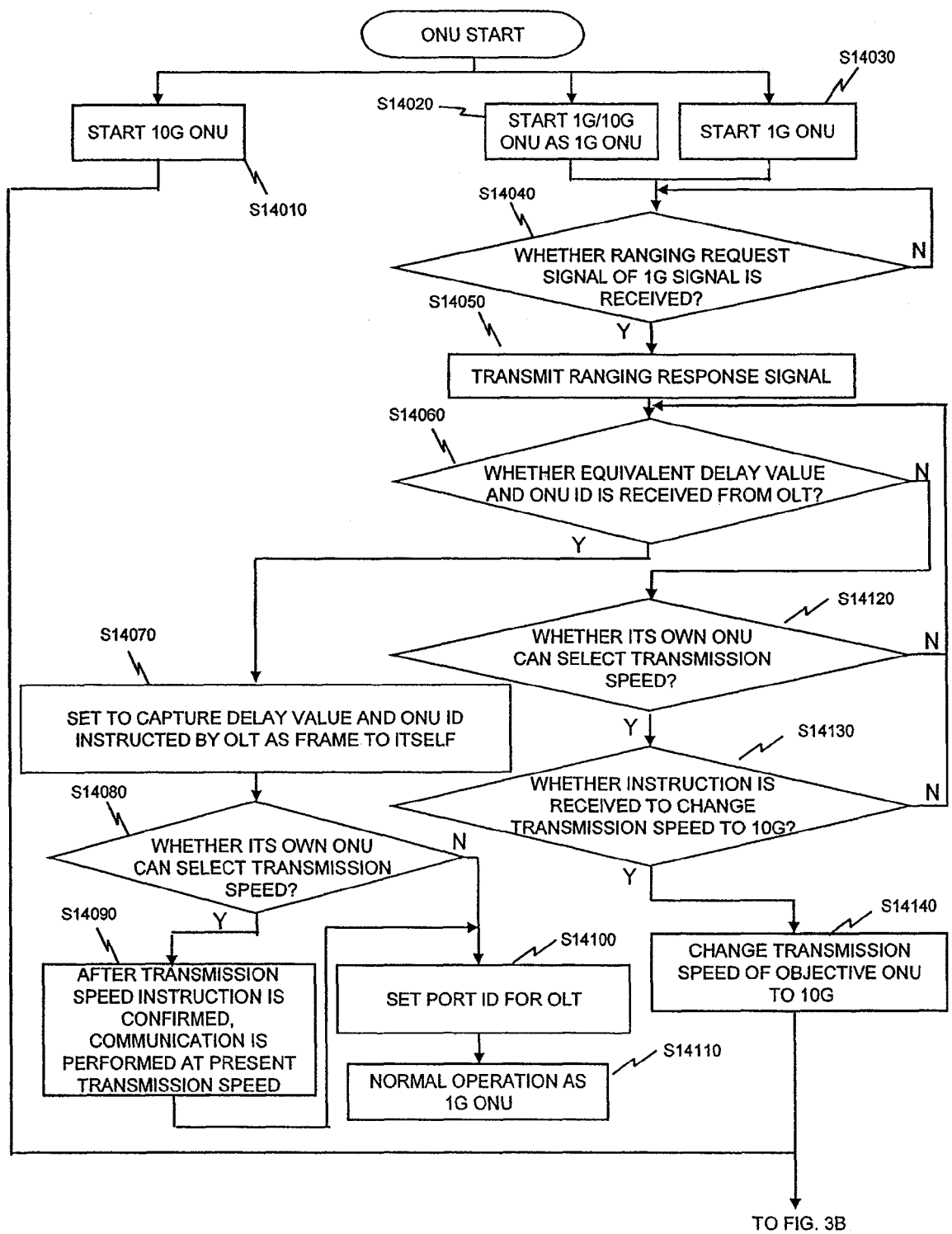
FIG. 3A is a flowchart 1 showing a flow of an ONU operation at the time of ranging.
Figure 3B:
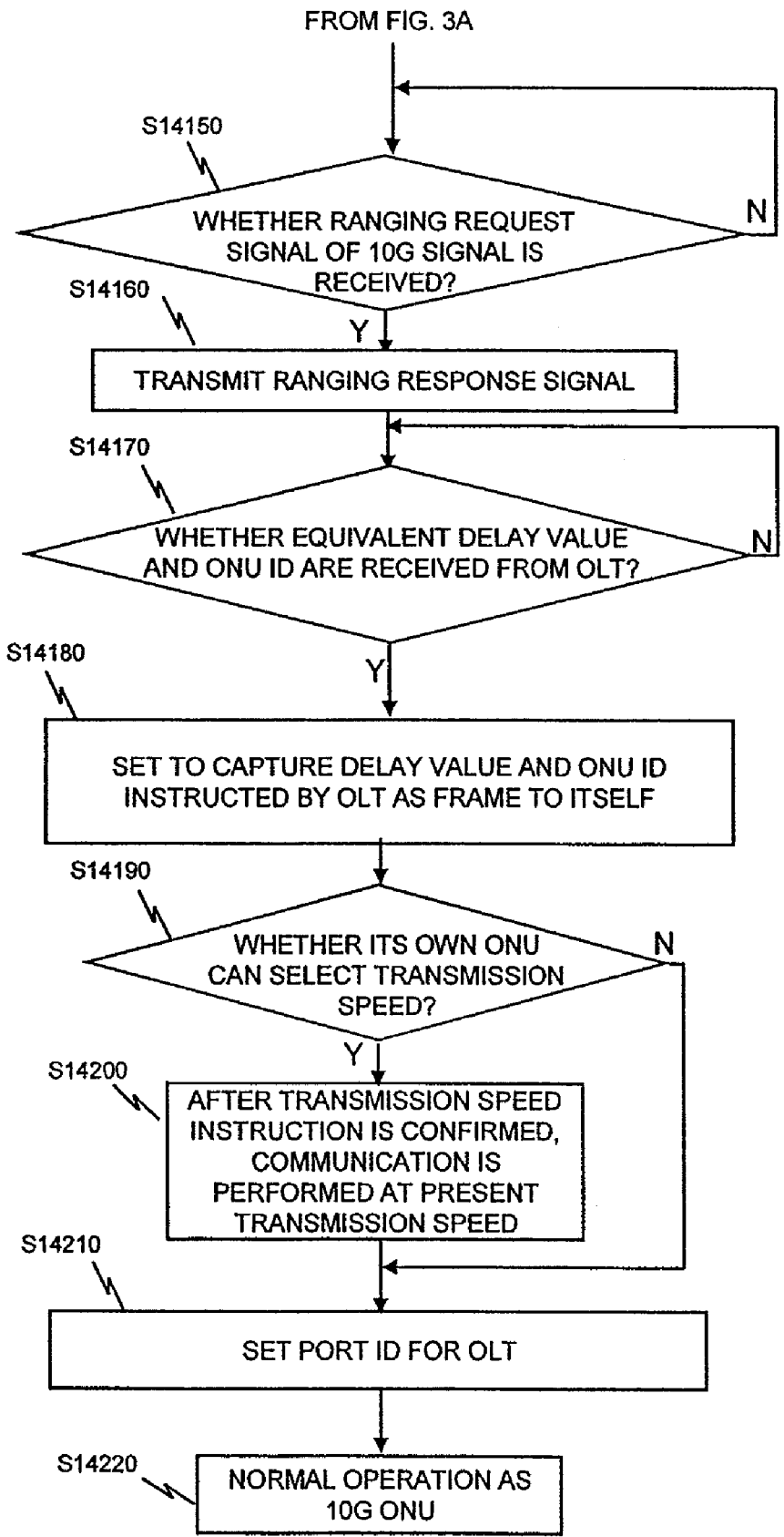
FIG. 3B is a flowchart 2 showing the flow of the ONU operation at the time of ranging.

FIG. 2A and FIG. 2B are flowcharts showing the flow of the operation of the OLT 200 at start-up. FIG. 3A and FIG. 3B are flowcharts showing the flow of the operation of the respective ONUs 300/310/320 at start-up.

In the flow of FIG. 3, the 1G/10G ONU 320 executes steps S14040 to 14220 after starting (S14020). The 1G ONU 310 executes steps S14040 to 14110 after starting (S14030). On the other hand, after starting (S14010), the 10G ONU 300 shifts to step 14150 and executes steps S14150 to S14220.

At start-up, the OLT 200 and the respective ONUs 300/310/320 perform distance correction called the ranging. First, in the OLT 200, the ranging request generation section 4230 transmits a ranging request signal to the respective ONUs 300/310/320. At this time, since the ONUs different in transmission speed are disposed under the OLT 200, for example, first, the ranging request signal of the 1G signal is transmitted to the 1G ONU 310 having the low transmission speed (FIG. 2: S13010). At this time, although the details will be described later, in the OLT 200, the overhead generation section 4170 and the downstream PON frame assembling section 4020 assemble signals from 10G signals. Thus, while the ranging of the 1G signal is performed, the ranging request generation section 4230 instructs the signal division section 4030 to change the path so that the signal is inputted to the speed converter 4040 to perform speed conversion to the 1G signal. Besides, while the ranging of the 1G signal is performed, the ranging request generation section 4230 instructs the signal multiplexing section 4050 to transfer the transferred 1G signal to the E/O 4060. Besides, the ranging request generation section 4230 instructs the E/o 4060 to perform conversion from the electric signal corresponding to the 1G signal to the optical signal.

In the 1G ONU 310 receiving the ranging request signal of the 1G signal, the ranging request termination section 10180 receives the ranging request signal, the ranging response generation section 10190 generates the ranging response signal, and the ranging response signal is sent back to the OLT 200 (FIG. 3: S14030 to S14050). Incidentally, when receiving the 1G signal, the 10G ONU 300 recognizes it as an error signal, and therefore, the ranging response signal is not transmitted to the OLT 200.

At start-up, the 1G/10G ONU 320 may be operated as, for example, the 1G ONU which has a margin in the minimum reception light level (FIG. 3: S14020). Thus, in this embodiment, the ranging request signal of the 1G signal is received by the 1G ONU signal 310 and the 1G/10G ONU 320, and the ONUs 310 and 320 send back the ranging response signal to the OLT 200 (FIG. 3: S14040, S14050).

The ranging response signal includes Serial_Number_ONU_message. Incidentally, in this embodiment, a part of the Serial_Number_ONU_message based on G.984.3 is changed. FIG. 4 is a structural view of the Serial_Number_ONU_message in the embodiment. The differences from G.984.3 of the related art are that portions of A and G of item 2 and item 12 are changed. Item 2 is a portion to specify that this is Serial_Number_ONU_message, and the portions of A and G of item 12 regulate the presence or absence of ATM and GEM support in the related art. In this embodiment, since a partial structure is changed, the indication of Message identification of item 2 is changed to suitable identification information. With respect to item 12, for example, it is assumed that this system transmits only the GEM frame, and the determination of the presence or absence of the ATM and GEM support is eliminated. Instead thereof, information for determining whether its own ONU can change transmission speed is added to one of the bits for the determination. Incidentally, the remaining 1 bit may be made Reserved and may not be used. Specifically, when the transmission speeds of the respective ONUs 300/310/320 are fixed, for example, a bit of "0" is set in the portion A, and when plural transmission speeds can be changed, for example, a bit of "1" is set in the portion A. Besides, since the determination function is introduced in the portion A, the portion G is made Reserved and is not used. The OLT 200 transmitting the ranging request signal of the 1G signal reads the bit from the Serial_Number_OUN_message in the ranging response signal sent back from the respective ONUs 300/310/320, and can determine whether the ONU issuing the reached signal is the ONU 310 corresponding to only 1G, or the 1G/10G ONU 320 sending back the ranging response signal of the 1G signal in accordance with the regulation at start-up. Incidentally, in this embodiment, although the Message identification is made the structure as shown in FIG. 4, no limitation is made to the items and the values, and they are merely used as an example.

Return is made to FIG. 2 and FIG. 3 and the operation will be described. In the OLT 200, when the ranging response signal of the 1G signal is received (S13020), the optical level detection section 4220 of the ranging measurement section 4200 detects the optical level of the received signal (FIG. 2: S13030). The ranging signal termination section 4210 receives the ranging response signal through the O/E 4080, the selector 4090 and the 1G ATC 4100, and performs the ranging operation such as the distance measurement between the OLT 200 and the respective ONUs 310/320 (FIG. 2: S13040) Incidentally, the optical level measurement (S13030) and the distance measurement (S13040) may be performed in parallel or in time series. At this time, since the OLT 200 receives the ranging response signal of the 1G signal, the ranging request generation section 4230 causes the O/E 4080 to correspond to the 1G signal through the 1G/10G switching control section 4205, and instructs the selector 4090 to transfer the ranging response signal transferred from the O/E 4080 to the 1G ATC 4100.

The OLT 200 (for example, the ONU transmission speed determination-information storage section 5010) determines the presence or absence of the speed support of the ONU from the previously set bit in the Serial_Number_ONU_message (FIG. 2: S13050). When the OLT 200 determines that the ONU can handle only the 1G signal, the transmission speed of 1G is used irrespective of the optical level (FIG. 2: S13070). Accordingly, after the ranging operation of the related art, such as the distance measurement, is performed (FIG. 2: S13040), for example, the ONU ID generation section 4240 assigns an ONU ID, sets the assigned ONU ID and the transmission speed instruction in Assign_ONU-ID message, and notifies the ONU (FIG. 2: 13100). Incidentally, the Assign_ONU-ID message will be described later.

On the other hand, when it is determined that the ONU can handle plural transmission speeds (in this embodiment, 10G signal can also be handled) (S13050), the OLT 200 determines, from the determination result of the optical level, whether the ONU is registered as the 1G ONU (FIG. 2: S13060). This is because even if the ONU supports the transmission speed of 10G, when the optical level does not satisfy a regulated value, there is a case where it is difficult to perform communication at the transmission speed of 10G. Then, the OLT 200 determines the transmission speed by the information on whether the transmission speed notified from the ONU can be changed and the detected value of the optical level. With respect to the optical level, reference is made to the result of detection by the optical level detection section 4220 in the ranging measurement section 4200. At this time, in the GPON of the related art, according to Amendment 1 of G.984.2, the level range of the optical signal is regulated as −28 dBm to −8 dBm. Although the 10G signal is not yet regulated clearly, for example, when correspondence to the 10G signal is made −22 dBm to −2 dBm, it is determined that the communication of the 10G signal is possible for the signal from the ONU 320 which is −22 dBm or higher (FIG. 2: S13060). Thus, when the optical level of the signal sent back from the ONU (in this embodiment, the 1G/10G ONU 320) capable of handling the plural transmission speeds is −22 dBm or higher (FIG. 2: S13060), the OLT 200 registers the ONU as the 10G ONU (FIG. 2: S13090). At that time, the OLT 200 does not issue the ONU ID for the 1G ONU, sets it in item 12 of Assign_ONU-ID message that the ONU is started as the 10G ONU, and makes notification to the ONU 320 (FIG. 2: S13100). Besides, when the optical level of the signal from the ONU 320 is lower than −22 dBm (FIG. 2: S13060) the OLT 200 registers the ONU as the 1G ONU (FIG. 2: S13080). That is, the OLT 200 assigns the ONU ID, sets it in item 12 of the Assign_ONU-ID message that communication is performed at the present transmission speed, sets the assigned ONU-ID in item 3, and makes notification to the ONU 320 (FIG. 2: 13100). Incidentally, the OLT 200 transmits an equivalent delay value based on the measured distance from the ONU at suitable timing to the ONU.

Besides, the ONU transmission speed determination-information storage section 5010 in the OLT 200 generates the transmission speed determination result table 600 shown in FIG. 6A. For example, the ONU transmission speed determination-information storage section 5010 stores the distance information measured in the ranging operation, the measured optical level, the information indicating whether the ONU can change the speed, and the speed information at the operation into the transmission speed determination result table 600 for each ONU.

FIG. 5 is a structural view of the Assign_ONU-ID message.

After the ranging process is ended, the OLT 200 adds a bit indicating whether subsequent communication is performed at the transmission speed to an unused field of item 12 in the Assign_ONU-ID message (FIG. 5), which is a signal to assign the ONU ID to the respective ONUs 300/310/320, and transmits the signal. Specifically, when communication is performed at the present transmission speed, for example, a bit of "1" is set in item 12, and when communication is performed at a different transmission speed, for example, a bit of "0" is set to cause the ONU to wait for the ranging request signal at the different transmission speed. The 1G/10G ONU 320 receiving the Assign_OUN-ID message confirms the bit of item 12, and can determine whether the operation is performed at the transmission speed at which the ranging process is performed or the transmission speed is changed and the ranging process is again performed for the OLT 200. Besides, since the form is different from that of the Assign_ONU-ID message of the related art, the signal content of item 2 indicating the Assign_ONU-ID message is also changed. Incidentally, in this embodiment, although the Assign_ONU-ID message is made to have the structure as shown in FIG. 5, no limitation is made to this value, and it is merely used as an example.

Return is made to FIG. 2 and FIG. 3, and the operation will be described. The 1G ONU 310 receives the ONU ID and the equivalent delay value, and performs setting of port ID (FIG. 2: S13110, FIG. 3: S14060 to S14080, S14100 to S14110). Incidentally, since the detailed contents are recited in G.984, the description thereof will be omitted. The ONU ID and that the operation is performed as the 1G ONU are notified by the Assign_ONU-ID message to the 1G/10G ONU 320 operating as the 1G ONU. The 1G/10G ONU 320 operating as the 1G ONU and receiving the notification performs the setting of port ID for the OLT 200 (FIG. 3: S14060 to S14110). On the other hand, the 1G/10G ONU 320 operating as the 10G ONU recognizes, from the transmission speed instruction in the Assign_ONU-ID message, that the ONU itself operates as the 10G ONU, and hereinafter operates as the 10G ONU without receiving the ONU ID (FIG. 3: S14060, S14120 to S14140).

Next, the OLT 200 transmits the ranging request signal of the 10G signal to the respective client ONUs 300/310/320 (FIG. 2: S13120). For example, the OLT 200 transmits the ranging request signal of the transmission speed of 1G, and then waits for the ranging response signal from the ONU for a previously determined time. With respect to the ranging response signal received during the period, for example, the process of S13030 to S13110 is performed. After the previously determined time passes, for example, it is determined that all ranging response signals from the ONUs operating at the transmission speed of the 1G signal are received, and the ranging request signal of the transmission speed of 10G is transmitted. At this time, since the 1G ONU 310 or the 1G/10G ONU 320 already operating as the 1G ONU recognizes an error when the signal is received, and it does not send back the ranging response signal to the OLT 200. The ranging response signal is sent back to the OLT 200 by the 10G ONU 300 and the 1G/10G ONU 320 that comes to operate as the 10G ONU after the ranging response signal of the 1G signal is sent back (FIG. 3: S14150 to S14160). In the 10G ONU 300, similarly to the 1G ONU 310, the distance measurement result is considered in accordance with the regulation of the related art, and the ONU ID is assigned. Besides, also with respect to the 1G/10G ONU 320 which comes to operate as the 10G ONU, the ONU ID is similarly assigned (FIG. 2: S13130 to S13150). At this time, since the same process as the 1G ONU is performed, also with respect to the 10G ONU, the transmission speed determination result table 610 as shown in FIG. 6B is generated. As a result, the ONU transmission speed determination-information storage section 5010 can obtain the information of the ONU ID and the transmission speed of all the ONUs 300/310/320 under the OLT 200. For example, the ONU transmission speed determination-information storage section 5010 stores the transmission speed information of the ONU into the ONU ID transmission speed correspondence table 620 in accordance with the assigned ONU-ID and the transmission speed determination result tables 600 and 610. The ONU ID transmission speed correspondence table 620 is used for generation of the downstream BW map 800 described below.

Thereafter, similarly to the ranging by the 1G signal, the respective ONUs 300/320 determine port ID for the OLT 200, and shift to the normal operation (FIG. 3: S14170 to S14220). The OLT 200 determines all ONU IDs and port IDs for the respective ONUs 300/310/320 operating with the 1G and 10G signals, and then shifts to the normal operation (FIG. 2: S13160, S13170).

By the above process, the 1G/10G ONU is set to the optimum transmission speed, and the OLT 200 can grasp the transmission speeds of all the client ONUs 300/310/320.

In the embodiment, as described above, whether the transmission speed of the ONU can be changed is determined by changing the ATM, GEM correspondence determination section in the Serial_Number_ONU_message, however, the embodiment is not limited to the determination using only the portion. Besides, also with respect to an instruction of the 1G/10G operation regulation of a non-used portion in the Assign_ONU-ID message, similarly, no limitation is made to the determination using only the portion. A suitable structure may be adopted in which the respective ONUs 300/310/320 notify the OLT 200 of the information as to whether the transmission speed can be changed. For example, in addition to the embodiment, a signal for transmission speed determination may be put on another place, another message may be expanded, or a new message may be defined. Besides, the regulation of the range of −22 dBm to −2 dBm for adopting the 10G signal is merely an example, the embodiment is not limited to this range, and a previously determined threshold or range may be used. Besides, since the function of the respective portions in the Serial_Number_ONU_message and the regulations of the respective portions in the Assign_ONU-ID message other than those described here are regulated in G.984.3, their detailed description here will be omitted. Besides, in this embodiment, at start-up, the ranging request is first transmitted at the transmission speed of 1G, however, the ranging request of 10G may be first transmitted.

(Process of Downstream Signal of the OLT)

The process in the case where the OLT 200 transmits the downstream signal will be described with reference to FIG. 9.

The OLT 200 receives data of the transmission speed of 10 Gbit/sec, which is transmitted to the respective ONUs 300/310/320, by the network IF 4001 as the interface to the upper network 20. The received data reaches the packet buffer section 4010, and is once stored in the queue buffers for each priority 4010-1 to 4010-4. The assembly of the downstream PON frame is performed by the operation of the queue buffers for each priority 4010-1 to 4010-4, the GEM header generation section 4180, the overhead generation section 4170, and the downstream PON frame assembling section 4020 based on the downstream BW map generation section 4160. Incidentally, the details will be described later. Thereafter, based on the transmission timing information of the downstream BW map 800 and the transmission speed information, the OLT 200 once separates the generated downstream PON frame into a portion transmitted with the 1G signal and a portion transmitted with the 10G signal by the signal division section 4030, and converts the portion transmitted with the 1G signal into the 1G signal by the speed conversion section 4040. The OLT 200 causes the signal after the conversion to be again joined by the signal multiplexing section 4050, and generates the downstream signal 130. The generated downstream signal 130 is transmitted to the respective ONUs 300/310/320 through the E/O 4060 to convert an electrical signal into an optical signal and the WDM filter 4070. Incidentally, in this embodiment, the downstream PON frame assembling section 4020 operates at 10G to assemble the frame, and converts the speed to 1G by the speed conversion section 4040. However, the 10G signal and the 1G signal may be separately generated and joined.

The assembly of the downstream PON frame will be described with reference to FIG. 11.

First, the priority-specific queue information monitor section 5000 captures queue information from the respective queue buffers for each priority 4010-1 to 4010-4. The queue information includes information of destinations to the respective ONUs 300/310/320, transmission amount and the like, which are transmitted in the next frame. The ONU transmission speed determination-information storage section 5010 previously notifies the downstream BW map table generation section 5020 of the applicable transmission speeds of the respective ONUs 300/310/320. For example, the information shown in FIG. 6C is notified. The downstream BW map table generation section 5020 obtaining the applicable transmission speeds of the respective ONUs 300/310/320 checks the data amount, the priority and the destination of the respective information and generates the downstream BW map 800.

For example, it is assumed that information to be transmitted to the ONU#33 (300-1) is stored in the queue of priority 1 of the queue buffers for each priority 4010-1 to 4010-4, information to be transmitted to the ONU#1 (310-2) is stored in the queue of priority 2, information to be transmitted to the ONU#34 (320-3) is stored in the queue of priority 3, and information to be transmitted to ONU#35 (300-4) is stored in the queue of priority 4. The priority-specific queue information monitor section 5000 captures the stored respective destinations and the information amount, and notifies them to the downstream BW map table generation section 5020. Thereafter, the downstream BW map table generation section 5020 assigns the bandwidth to the ONU based on the priority-specific queue information and obtains the transmission timing (Start, End). Besides, the downstream BW map table generation section 5020 refers to the transmission speeds of the respective ONUs 300/310/320 of the ONU ID transmission speed correspondence table 820 generated by the ONU transmission speed determination-information storage section 5010 in advance, and generates the downstream BW map 800 as the list of the priority of information to be transmitted, the transmission speed to the respective destinations, and the secured bandwidth. Incidentally, at this time, the bandwidth assignment of the overhead information of the next frame is also added, and at the arrival of the next frame, the reception timing becomes clear from the overhead information of each transmission speed. Incidentally, the assignment bandwidth shown in the drawing is an example, and the embodiment is not limited to the bandwidth.

The downstream BW map table generation section 5020 puts the generated downstream BW map 800 on the overhead of the present downstream PON frame transmitted before the next frame. Besides, the downstream BW map table generation section 5020 notifies the signal division section 4030 and the signal multiplexing section 4050 of the generated downstream BW map 800. The signal division section 4030 receiving the notification distributes the downstream PON frame sent from the downstream PON frame assembling section 4020 to the 10G signal or the 1G signal based on the downstream BW map 800. Specifically, for example, the signal division section 4030 can know the transmission speed for the overhead or the respective payloads to the respective ONUs 300/310/320, the start timing of the data, and the end timing from the downstream BW map 800. Thus, at the timing of a signal specified as a 10G signal, the signal is transmitted to the signal multiplexing section 4050, and at the timing of a signal specified as a 1G signal, the signal is transmitted to the speed conversion section 4040, and the speed conversion section 4040 converts the 10G signal to the 1G signal. Incidentally, in this embodiment, the data distribution from the upper network 20 is divided into the four stages of priority 1 to priority 4 for each priority. However, this is a distribution example, and this division number is not necessarily regulated, and may be changed to a suitable number. Besides, since the generation of the overhead and the GEM header except the grant designation and the downstream BW map is determined by Recommendation G.984, the detailed description thereof will be omitted here.

Next, the OLT 200 uses the generated downstream BW map 800, and generates the downstream PON frame. The downstream PON frame assembling section 4020 of the OLT 200 uses the packet buffer section 4010 operating based on the downstream BW map generation section 4160, the GEM header generation section 4180, and the overhead generation section 4170, and assembles the downstream signal 130 as described below.

(1) The downstream PON frame assembling section 4020 receives the signal from the overhead generation section 4170, and assembles the overhead including the frame synchronization patterns 2000/2001, the PLOAM fields 2010/2011, the grant designation fields 2020/2021, and the BW maps 2030/2031 for next downstream frame. Incidentally, the frame synchronization patterns 2000/2001, the PLOAM fields 2010/2011, the grant designation fields 2020/2021, and the downstream BW maps 2030/2031 for the next frame, which constitute the overhead, are prepared by the number of the transmission speeds.

(2) The downstream PON frame assembling section 4020 enters the GEM headers 2050/2051 to the respective ONUs 300/310/320 and the data to the respective ONUs 300/310/320, which are received from the GEM header generation section 4180 and generated for the frame, into the frame payload 2040 after the overhead in accordance with the order of determination of the downstream BW map 800 generated for the frame.

(3) Since the downstream BW map generation section 4160 determines the length and order of the data to the ONUs 300/310/320, which is time-division multiplexed in the frame payload 2040, so that the frame length becomes 125 μsec, the process (2) is repeated in accordance with this determination.

With respect to the signal requested to be applied to the 1G signal by the signal division section 4030, the downstream signal assembled by the downstream PON frame assembling section 4020 is converted into the 1G signal through the speed conversion section 4040 based on the downstream BW map 800 generated for the frame. At this time, since the overhead portions are generated for plural signals (in this embodiment, two signals for 1G and 10G), the speed conversion section 4040 operates in accordance with the timing of each structure of the overhead portion, so that the structure of 1G is generated also for the overhead portion. Thereafter, the signal multiplexing section 4050 again mixes the 1G signal and the 10G signal in the order of the downstream BW map 800 and generates the downstream signal 130. The signal 130 is converted from the electrical signal to the optical signal by the optical modulation unit (E/O: 4060), and is outputted to the trunk optical fiber 110 through the WDM filter 4070. At this time, in the E/O 4060, based on the downstream BW map 800, conversion to the suitable optical signal is performed for the respective fields of the different transmission speeds in the downstream signal 130. There is a possibility that the transmission power of the E/O 4060 is different between the 1G signal and the 10G signal, switching can be performed in this embodiment.

The downstream signal 130 is broadcasted to the respective ONUs 300/310/320 through the trunk optical fiber 110, the optical splitter 100, and the branch optical fiber 120. Incidentally, when the OLT 200 first transmits the downstream PON frame to the respective ONUs 300/310/320, for example, a frame having only the overhead including the downstream BW map 800 may be transmitted to notify the respective ONUs 300/310/320 of the arrival timing of the next frame.

(Process of Upstream Signal in the OLT)

Hereinafter, the process at the time when the OLT 200 receives the upstream signal 140 will be described. The upstream signal received by the OLT 200 first passes through the WDM filter 4070, the O/E 4080, and the selector 4090. At this time, based on the grant designation table 700 corresponding to the upstream signal, the 1G/10G switching control section 4205 switches to correspond to the transmission speed of the signal received by the O/E 4080 or the selector 4090. There is a possibility that the impedance value of the O/E 4080 is different between the 1G signal and the 10G signal, in this embodiment, switching can be performed. The received upstream signal 140 reaches the upstream PON frame demultiplex section 4120 through the 1G ATC 4100 or the 10G ATC 4110 corresponding to the transmission speed. In each of the ATCs, a reset signal is inserted at the time of arrival of the data of its own transmission speed. The upstream signal 150 from the respective ONUs 300/310/320 is time-division multiplexed and is received by the OLT 200. However, the optical signal levels of these signals vary. The reset signal has an effect to cause high-speed and accurate upstream signal reception to be performed by once resetting the signal reception level in the ATCs 4100/4110 of the OLT 200 each time each of the upstream signals 150 is received. Thereafter, the upstream PON frame demultiplex section 4120 demultiplexes the upstream PON frame, and transfers the payload information to the communication processing section 4130. The communication processing section 4130 processes the transferred payload information into an Ether packet, and transfers it to the packet buffer section 4140. Thereafter, the Ether packet is sent to the upper network through the network IF 4150.

Besides, the OLT 200 obtaining the queue length report from the upstream PON frame generates a new grant designation table 700. Specifically, for example, the upstream PON frame demultiplex section 4120 sends the queue length report demultiplexed from the upstream PON frame to the grant designation generation section 4190. The queue length report includes the amount of information desired to be sent at the next transmission from the respective ONUs 300/310/320. Besides, the ONU transmission speed determination-information storage section 5010 notifies the grant designation generation section 4190 of the transmission speed of the respective ONUs 300/310/320. Based on these information, the grant designation generation section 4190 generates the grant designation table 700. Since the specific generation method is regulated in G.984, the detailed description thereof will be omitted. Briefly, the transmission speed information of the respective ONUs is added to the grant designation generated in accordance with the regulation in G.984. The 1G/10G switching control section 4205 receiving the grant designation table 700 issues an instruction to the selector 4090 according to the receiving timing, and switches between the 1G ATC 4100 and the 10G ATC 4110, so that the OLT 200 can receive the data from the respective ONUs 300/310/320 without error.

(Process of Downstream Signal in the ONU)

The process of the ONU in the case where the downstream signal 130 is received will be described with reference to FIG. 13 while the 10G ONU 300 is used as an example.

The downstream signal 130 received from the branch optical fiber 120 is converted into the electrical signal by the O/E 9010 to convert an optical signal into an electrical signal through the WDM filter 9000. The 1G signal is discarded in the 10G signal selection section 9020, and the 10G signal passes through the 10G signal selection section 9020. Besides, the 10G signal is attenuated when passing through the optical fibers 110 and 120 and the optical splitter 100, and after the 10G signal is converted to a specified signal level through the 10G ATC 9030, PON frame separation is performed.

The PON frame separation section 9040 separates the overhead multiplexed on the received downstream signal 130 and the payload 2060. Although a detailed description will be omitted, when the PON frame separation section 9040 finds the head of the downstream signal 130 in the frame synchronization pattern 2001, the PON frame separation section performs setting necessary for the operation of the ONU based on the PON control message entered in the PLOAM field 2011. Besides, the control message including the monitor result of its own ONU and the control content requested to the OLT 200 is generated, is entered in the PLOAM field 3020 of the upstream signal 150, and is transmitted to the OLT 200. Incidentally, the downstream BW map termination section 9050 confirms the downstream BW map 2031 in the overhead separated by the PON frame separation section 9040, and notifies the 10G signal timing control section 9060 of the information.

The 10G signal timing control section 9060 determines the timing of the 1G signal and the 10G signal in accordance with the downstream BW map 2031 with respect to the frame at the next arrival. At the timing control, for example, since the downstream BW map 2031 includes also the state of the signal to itself, the 10G signal selection section 9020 does not capture only the 10G signal, and with respect to the frame payload 2040, only the frame payload 2040 including the signal to itself in the 10G signal may be captured. Besides, the grant termination section 9070 extracts the grant designation to its own ONU from the grant designation entered in the grant designation field 2021. The ONU 300 extracts the information from the packet buffer section 9110 according to the transmission timing of the upstream signal of its own ONU indicated by the grant designation field 2021, generates the upstream signal 150, and transmits it to the OLT 200.

Further, the PON frame separation section 9040 confirms the content of the GEM header 2050 multiplexed on the frame payload 2040. Here, when the GEM header 2050 is for its own ONU, the PON frame separation section 9040 transmits the data of the payload 2060 subsequent to the GEM header to the frame distribution section 9080, and discards the other GEM header 2050 and data of the payload 2060. For example, reference is made to the downstream BW map 2031 from the 10G signal timing control section 9060, and only the signal to itself multiplexed on the frame payload 2040 is extracted, and further, reference is made to the GEM header 2050, and only the payload to its own ONU may be extracted. The frame distribution section 9080 once stores the received data into the packet buffer section 9090 of each of the terminals 400/410 of the destinations. The stored data is transmitted to the respective terminals 400/410 through the user IF 9100 as the interface to the terminal.

Also with respect to the 1G ONU 310, the process is the same as the process of the 10G ONU 300 except for the difference in the transmission speed. For example, in the ONU 310 corresponding to the transmission speed of 1G, the 10G signal is discarded in the 1G signal selection section 10020, and the 1G signal passes through the 1G signal selection section 10020. Besides, for example, in the ONU 310 corresponding to the transmission speed of 1G, instead of capturing only the 1G signal, only the overhead of the 1G signal and the frame payload 2040 including the signal to itself in the 1G signal may be captured.

In the 1G/10G ONU 320, the setting is performed to the suitable transmission speed in the ranging process, so that the process is performed similarly to the 10G ONU 300 or the 1G ONU 310. The difference from the 1G ONU or the 10G ONU is that for example, at the ranging, the Assign_ONU-ID_message termination section 11055 receives the Assign_ONU-ID_message, and the ONU determines its own corresponding speed. The details are as described in the operation at the ranging. The 1G/10G switching-timing control section 11060 before the normal operation operates its own ONU as the 1G ONU until the transmission speed information received by the Assign_ONU-ID_message termination section 11055 is confirmed, and for that purpose, the 1G/10G switching-timing control section sets the downstream side selector 11020 of the signal path to select the 1G signal and makes the ATC, to which the signal is transferred, the 1G ATC 1130-1, sets the upstream side selector 11200 on the 1G transmission section 11220 side, and sets the O/E 11010 and the E/O 11170 to 1G. When the 1G/10G switching-timing control section 11060 confirms the transmission speed at the normal operation, the 1G/10G switching-timing control section 11060 switches the O/E 11010, the downstream side selector 11020, the ATC 11030, the upside selector 11200, and the E/O 11170 so that they operates at only the determined transmission speed, and fixes the transmission speed. Since the transmission speed is different between the 1G transmission and the 10G transmission, the upstream side selector 11200 divides the passage to adjust the speed of the upstream data based on the operating transmission speed. Besides, with respect to the O/E 11010, since there is a possibility that the impedance value is different between the 1G signal and the 10G signal, the switchable structure is adopted in this embodiment. With respect to the E/O 11170, since there is a possibility that the transmission power is different, the switchable structure is adopted in this embodiment.

Hereinafter, the 1G/10G switching-timing control section 11060 performs the same functions as the 1G timing control section 10060 or the 10G signal timing control section 9060 of the 1G ONU 310 or the 10G ONU 300, so that the same operation as the 1G ONU 310 or the 10G ONU 300, in which the transmission speed is fixed, is performed, and accordingly, the description thereof will be omitted.

(Process of Upstream Signal in the ONU)

Next, the process of the ONU at the time when the upstream signal is transmitted will be described with reference to FIGS. 13 to 15.

The data transmitted by the respective terminals 400/410 is once stored in the packet buffer section 9110/10110/11110 through the user IF 9100/10100/11100. The upstream PON frame generation section 9160/10160/11160 assembles the upstream signal 150 as described below based on the timing information of the grant designation field 2020/2021 received by the grant termination section 9070/10070/11070. The generated upstream signal 150 is converted into the optical signal by the E/O 9170/10170/11170, and then is transmitted to the OLT 200 through the WDM filter 9000/10000/11000 and through the branch optical fiber 120.

Hereinafter, the details of the assembling process of the upstream signal 150 will be described.

The transmission control section 9120/10120/11120 reads data of only the bandwidth (amount of data allowed to be transmitted) determined by the grant designation field 2020/2021 in the OLT 200 and generates the payload 3310/3311. In the ONU 300/320 corresponding to the transmission speed of 10G, the 10G payload is generated. In the ONU 310/320 corresponding to the transmission speed of 1G, the 1G payload 3311 is generated. The upstream PON frame generation section 9160/10160/11160 attaches the GEM header 3300/3301 generated by the GEM header generation section 9130/10130/11130 to the front of the payload 3310/3311, and generates the frame payload 3040/3041. With respect to the details of the GEM header 3300/3301, since those regulated in Recommendation G.984 can be used, the description thereof will be omitted. The transmission control section 9120/10120/11120 enters the control message including the monitor result of its own ONU and the control content requested to the OLT 200 into the PLOAM field 3020/3021 of the upstream signal 150. Besides, the queue length monitor section 9150/10150/11150 monitors the amount of data which is stored in the packet buffer section 9110/10110/11110 and waits for transmission to the OLT 200, and enters the data amount as the queue length report into the queue length field 3030/3031 regulated between the PLOAM field 3020/3021 and the frame payload 3040/3041. The upstream PON frame generation section 9160/10160/11160 adds the burst overhead 3100/3101 having the preamble field 3000/3001 and the delimiter field 3010/3011 generated by the overhead generation section 9140/10140/11140 to the front of the burst data 3120/3121 in which the control signal 3110/3111 having the PLOAM field 3020/3021 and the queue length field 3030/3031 is added to the front of the frame payload 3040/3041, and assemble the upstream signal 150. The upstream signal 150 is added with the guard time 3200 based on the grant designation specified from the OLT 200, and is transmitted at the timing specified by the grant designation field 2020/2021.

According to the structure and operation of the OLT 200 and the respective ONUs 300/310/320, even if the transmission of high speed data such as 10 Gbit/sec is newly requested for the GPON operating at 1 Gbit/sec, it is possible to easily provide the PON including the OLT and ONUs, which has a structure in which signals of different transmission speeds can be mixedly contained and operated, and its communication method.

Incidentally, in this embodiment, the transmission timing of the upstream signal 150 from the respective ONUs 300/310/320 can be determined similarly to the GPON regulated by ITU-T Recommendation G.984. Specifically, at start-up of the PON system, the control parameters necessary for the system operation and the transmission speed of the ONU 320 capable of receiving at plural transmission speeds are determined in the process called the ranging, the port ID and various control parameters are set in the OLT 200 and the respective ONUs 300/310/320, and then, the OLT 200 determines the amount (bandwidth) of data allowed to be transmitted to the respective ONUs on the basis of the queue length report received from the respective ONUs 300/310/320 and the allowable traffic based on the contract. When the OLT notifies the respective ONUs 300/310/320 of the transmission allowance timing (grant) corresponding to the determined bandwidth by the grant designation field 2020/2021, the respective ONUs 300/310/320 transmit the upstream signal 150 to the OLT 200 at the timing.

2. Second Embodiment

In the first embodiment, with respect to the flow of the transmission speed determination of the ONU 320 capable of communicating at both the transmission speeds of 1G and 10G, the optical level is detected in the OLT 200, and the transmission speed is determined by the result. In addition to this method, the optical level is detected in the 1G/10G ONU 320, and the transmission speed of the 1G/10G ONU 320 can also be determined by the result.

For example, in the PON system shown in FIG. 1, the OLT 200 and the 1G/10G ONU 320 are replaced by an OLT 1200 and a 1G/10G ONU 1320.

Figure 18:
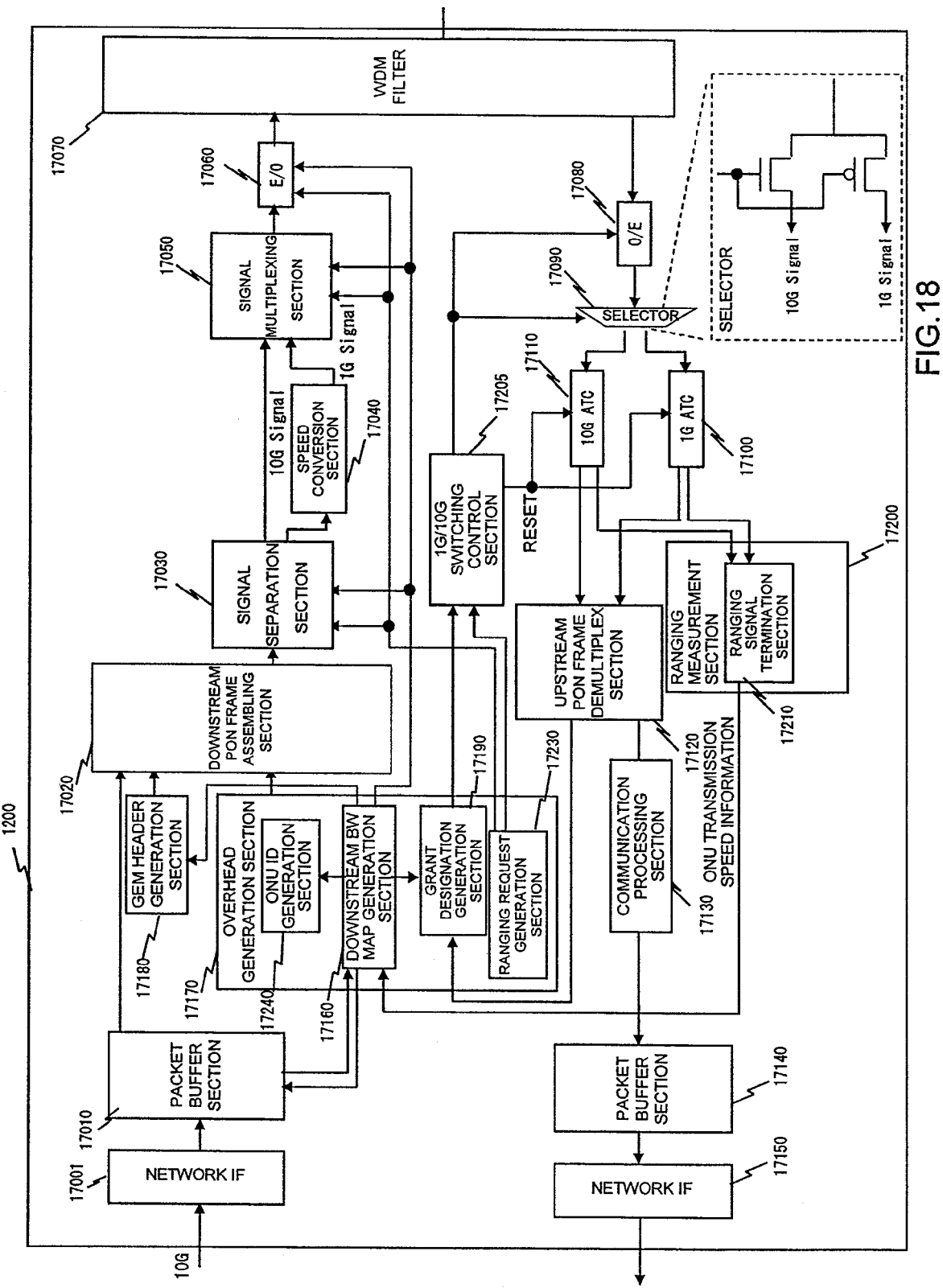
FIG. 18 is a block diagram showing a structural example of an OLT in the case where optical level detection is performed in the ONU.

FIG. 18 is a structural view of the OLT 1200 at the time when the 1G/10G ONU detects the optical level.

In the OLT 1200, for example, the optical level detection section 4220 can be omitted from the OLT 200 shown in FIG. 9. Besides, in a downstream BW map generation section 17160, for example, the function to determine the result of the optical level of the ONU transmission speed determination-information storage section 5010 can be omitted. The OLT 1200 first performs the ranging process at the transmission speed of 1G similarly to the above, and assigns an ONU ID to an ONU transmitting a ranging response signal. The foregoing process is repeated for all ONUs transmitting the ranging response signals, and generates an ONU ID transmission speed correspondence table 900 (FIG. 20A). Next, the ranging process is similarly performed also at the transmission speed of 10G, and an ONU ID transmission speed correspondence table 910 (FIG. 20B) is generated. As a result of assigning the ONU ID for each transmission speed, an ONU ID transmission speed correspondence table 920 (FIG. 20C) is formed which is a list in which the ONU ID and the transmission speed are made to correspond to each other. This corresponds to the ONU ID transmission speed correspondence table 620, and a downstream BW map 800 is generated based on the correspondence table. Since the other structure of the OLT 1200 is similar to the OLT 200 of FIG. 9, the detailed description thereof will be omitted. In this structure, since the 1G/10G ONU determines the transmission speed, the OLT 1200 does not pay attention to the fact that the 1G/10G ONU is contained, and can perform the same operation as the structure in which the client ONU is either one of the 1G ONU 310 and the 10G ONU 300.

Figure 19:
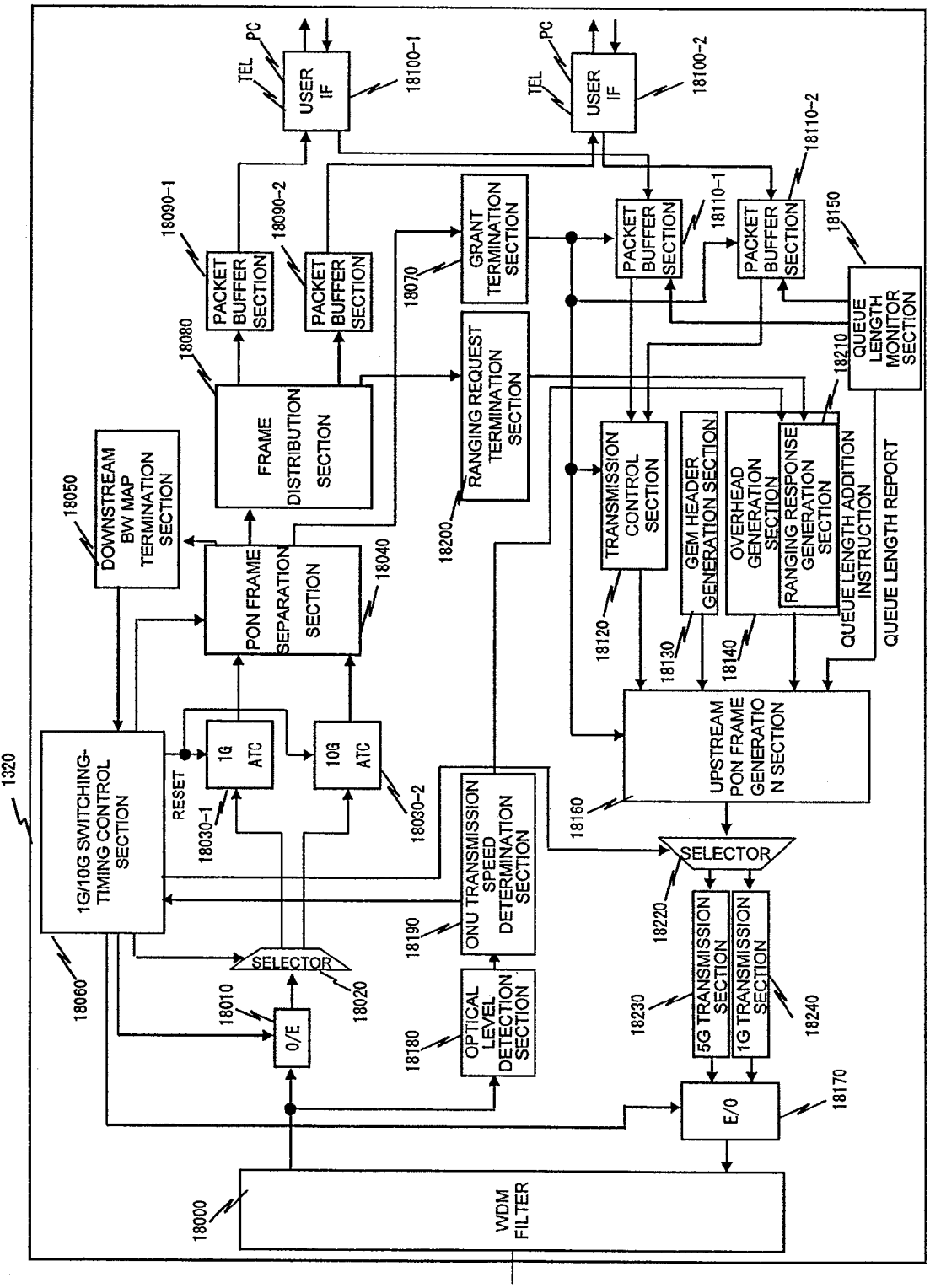
FIG. 19 is a block diagram showing a structural example of the 1G/10G ONU provided with the optical level detection function.

FIG. 19 is a structural view of the 1G/10G ONU 1320 having the detection function of the optical level.

The 1G/10G ONU 1320 further includes an optical level detection section 18180 and an ONU transmission speed determination section 18190, for example, the ONU 320 of FIG. 15. Although the detailed process will be described later, the optical level detection section 18180 detects the optical level of the ranging request signal sent from the OLT 1200, and notifies the ONU transmission speed determination section 18190 of the detection result. The ONU transmission speed determination section 18190 determines from the detection result and previously determined relation whether its own ONU is made to operate as the 1G ONU or the 10G ONU. At this time, in the GPON of the related art, the level range of the optical signal is regulated to −27 dBm to −8 dBm according to Amendment 1 of G.984.2. Although the level range of the 10G signal is not clearly regulated, for example, when it is assumed that the correspondence of the 10G signal is −21 dBm to −2 dBm, when the signal from the OLT 1200 has −21 dBm or higher, the 1G/10G ONU 1320 determines that the communication of the 10G signal is possible, and its own ONU is made to operate as the 10G ONU. Besides, when the detected optical level does not reach −21 dBm, its own ONU is made to operate as the 1G ONU. Since the switching process in the 1G/10G ONU 1320 for realizing the operation at the respective transmission speeds is described before, the detailed description thereof will be omitted. At this time, in this embodiment, for example, the ONU transmission speed determination section 18190 issues an instruction to the 1G/10G switching-timing control section 18060. The 1G/10G switching-timing control section 18060 notifies the O/E 18010, the downstream side selector 18020, the E/O 18170, and the upstream side selector 18220 that the operation is performed by the 1G signal or the 10G signal, and switching is performed. Incidentally, for example, the ONU transmission speed determination section 18190 itself may notify the respective blocks. In this embodiment, an example of the structure is described in which the ONU itself determines the transmission speed of its own operation from the optical level, and performs the switching process. Besides, the regulation that the range for operation as the 10G ONU is −21 dBm to −2 dBm is merely an example, and the embodiment is not limited to this range.

FIG. 20 is a structural view of an ONU ID transmission speed correspondence table. Since the ONU ID transmission speed correspondence table 920 is similar to the ONU ID transmission speed correspondence table 620, the detailed description thereof will be omitted. FIG. 20A shows an example of information stored by performing the ranging process at the transmission speed of 1 Gbit/sec. FIG. 20B shows an example of information stored by performing the ranging process at the transmission speed of 10 Gbit/sec. FIG. 20C shows a combination of FIGS. 20A and 20B.

Figure 16:
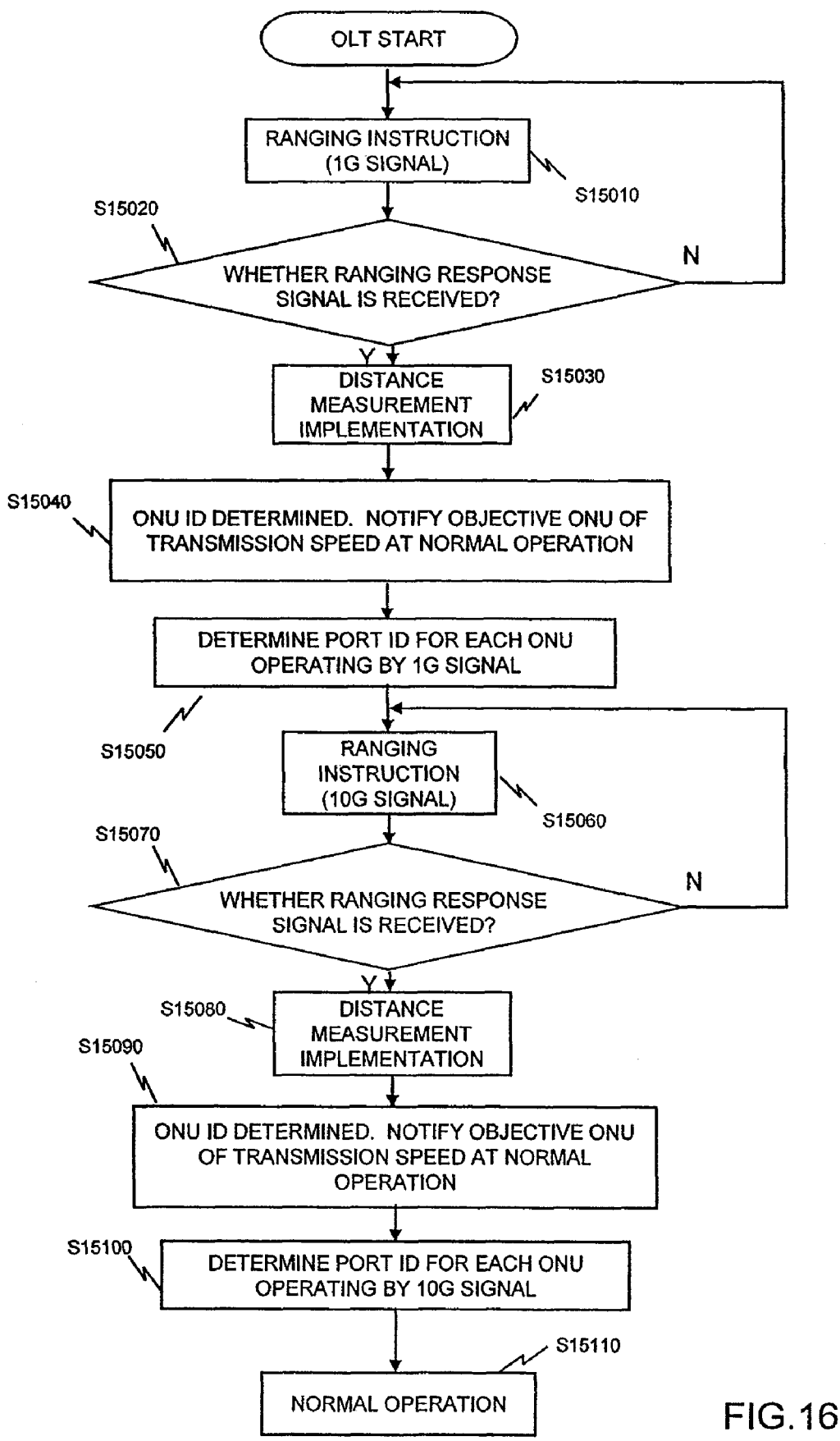
FIG. 16 is a flowchart showing a flow of an operation at the time of ranging of an OLT in the case where optical level detection is performed in an ONU.
Figure 17:
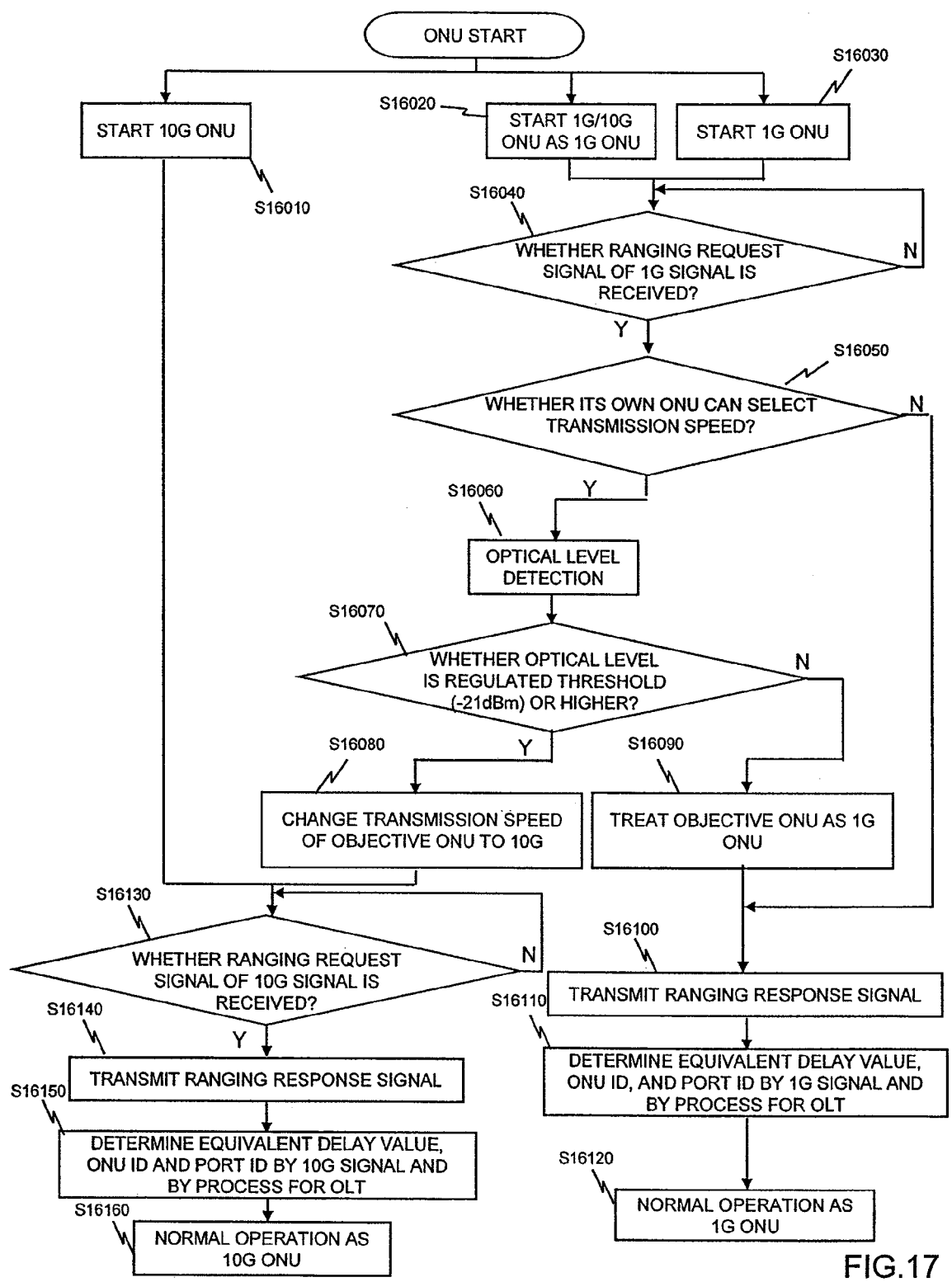
FIG. 17 is a flowchart showing a flow at the time of ranging of the ONU when an optical level detection function is provided for the 1G/10G ONU.

FIG. 16 is a flowchart showing a flow of an operation at the ranging of the OLT in the case where the ONU performs the optical level detection. FIG. 17 is a flowchart showing a flow at the ranging of the ONU in the case where the 1G/10G ONU performs the optical level detection.

At the ranging, the OLT 1200 transmits the ranging request signal to the respective ONUs 300/310/1320. At this time, the ranging request signal is sent to the respective ONUs 300/310/1320 by the 1G signal similarly to the above (FIG. 16: S15010). At the ONU side, the 1G ONU 310 and the 1G/10G ONU 1320 specified to be operated at 1G at start-up are started (S16020, S16030), and receive the ranging request signal (FIG. 17: S16040). When receiving the 1G signal, the 10G ONU 300 recognizes it to be an error signal, and does not receive the ranging request signal. The 1G ONU 310 receiving the ranging request signal of the 1G signal transmits the ranging response signal to the OLT 1200 (FIG. 17: S16050, S16100).

In the 1G/10G ONU 1320, the optical level detection section 18180 in its own ONU measures the optical level of the received signal, and notifies the ONU transmission speed determination section 18190 of the result (FIG. 17: S16050, S16060). The ONU transmission speed determination section 18190 receiving the notification instructs the 1G/10G switching-timing control section 18060 to cause the operation as the 1G ONU when the measured optical level is lower than a regulated level. The 1G/10G switching-timing control section 18060 instructed to cause the operation as the 1G ONU notifies the O/E 18010, the downstream side selector 18020, the upstream side selector 18220, and the E/O 18170 that the operation is performed by the 1G signal, and switches the transmission speed (FIG. 17: S16070, S16090). Besides, the ONU transmission speed determination section 18190 also notifies the ranging response generation section 18210 that the operation is performed by 1G, and transmits the ranging response signal to the OLT 1200 (FIG. 17: S16100). The 1G/10G ONU 1320 transmitting the ranging response signal performs distance measurement for the OLT 1200 and setting of the ONU ID and port ID, and shifts to the normal operation (FIG. 16: S15020 to S15050, FIG. 17: S16110, S16120). The OLT 1200 generates the ONU ID transmission speed correspondence table 900 in which the respective ONU IDs assigned to the ONUs in the above process and the transmission speed (1G) are made to correspond to each other.

On the other hand, when the optical level is the regulated level or higher (S16070), the ONU transmission speed determination section 18190 instructs the 1G/10G switching-timing control section 18060 to cause the operation as the 10G ONU. The instructed 1G/10G switching-timing control section 18060 notifies the O/E 18010, the downstream side selector 18020, the upstream side selector 18220, and the E/O 18170 that the operation is performed by the 10G signal, and switches the transmission speed (FIG. 17: S16070, S16080). Differently from the operation as the 1G ONU, an instruction is issued to the ranging response generation section 18210 not to generate the ranging response signal to the OLT 1200, and waiting is performed until the ranging request signal of 10G signal reaches (FIG. 17: S16130). At the flow of the series of ranging processes of the ONU 1320 having the optical detection function, it is not necessary for the OLT 1200 to distinguish between the 1G ONU 310 and the 1G/10G ONU 1320 operating as the 1G ONU, and can perform the process of performing the distance measurement and assigning the port ID and the ONU ID on the assumption that all ONUs are 1G ONUs (FIG. 16: S15020 to 15050).

Thereafter, the OLT 1200 finishing the processes of all the 1G ONUs transmits the ranging request signal of the 10G signal to the respective ONUs 300/310/1320 (FIG. 16: S15060). For example, after transmitting the ranging request signal of the transmission speed of 1G, the OLT 1200 waits for the ranging response signal from the ONU for a previously determined time. With respect to the ranging response signal received in the period, for example, the process of S15030 to S15050 is performed. After the previously determined time passes, the OLT 1200 transmits the ranging request signal of the transmission speed of 10G. In the 1G/10G ONU 1320 decided to operate as the 10G ONU, when the ranging request signal of 10G reaches, the ranging response generation section 18210 generates the ranging response signal, and transmits, as the 10G ONU, the ranging response signal to the OLT 1200 (FIG. 17: S16130, S16140). Thereafter, similarly to the normal 10G ONU, the ONU ID and port ID are set for the OLT 1200, and a shift is made to the normal operation (FIG. 17: S16150, S16160).

Similarly to the first embodiment, the 10G ONU 300 receives the ranging request signal of the 10G signal, and transmits the ranging response signal (FIG. 17: S16130, S16140). When receiving the ranging response signal from the 10G ONU 300 or the 1G/10G ONU 1320 operating as the 10G ONU, the OLT 1200 performs the processes of the distance measurement and the assignment of the port ID and ONU ID on the assumption that all ONUs are 10G ONUs (FIG. 16: S15070 to S15100). Thereafter, the OLT 1200 shifts to the normal operation (FIG. 16: S15110). The OLT 1200 generates the ONU ID transmission speed correspondence table 910 in which the respective ONU IDs assigned to the ONUs in the above process and the transmission speed (10G) are made to correspond to each other. At this time, differently from the case where the OLT 200 determines the transmission speed of the 1G/10G ONU 320, when the 1G/10G ONU 1320 transmits the ranging response signal, since its own transmission speed is determined, the OLT 1200 performs the process for each of the 1G ONU and the 10G ONU, and accordingly, the Serial_Number_ONU_message and Assign_ONU-ID message may have the structure of the related art. Incidentally, the other structure and process are the same as those of the first embodiment.

As described above, by the structure and the operation of the PON, the OLT and the ONU of the first and the second embodiments, it is possible to provide the PON having the structure in which existing PON equipments are contained and a shift can be made to a new PON, that is, PONs are mixed and can be operated, and its communication method. Besides, it is possible to provide the PON having the structure in which PONs of plural specifications (regulations) having different transmission speeds are mixed and can be operated, and its communication method. Incidentally, even if the PONs of the plural transmission speeds are mixed, the contents of the respective PONs are not erroneously interpreted, and the occurrence of an alarm or an erroneous operation can be prevented. Besides, in the PON in which the communication signal from the OLT to the plural ONUs is time-division multiplexed and is transmitted, the OLT can contain the plural mixed ONUs different in transmission speed. Besides, even if the request for expansion of the communication service capacity occurs, only the corresponding OLT and ONU can be exchanged, and the exchange cost of the communication equipment can be suppressed. In addition to that, when the ONU capable of supporting the plural transmission speeds is operated, the best transmission speed corresponding to the arrangement of the ONU can be provided, and the effective use of the bandwidth in total becomes possible.

The present invention can be used for, for example, a PON system.

What is claimed is:
1. A passive optical network system comprising:
 a master station to communicate at a first transmission speed and a second transmission speed higher than the first transmission speed; and
 slave stations including a first slave station that can communicate with the master station through an optical fiber network at the first and the second transmission speeds, and communicates with the master station at a transmission speed selected from the first and the second transmission speeds,
 wherein the master station includes:
 an optical level detection section to measure an optical level of a signal received from the first slave station; and
 a transmission speed determination section that selects the second transmission speed when the measured optical level is a previously determined threshold or higher, selects the first transmission speed when the measured optical level is lower than the previously determined threshold, and transmits a transmission speed instruc- tion indicating the selected first or second transmission speed to the first slave station through the optical fiber network, and wherein the first slave station includes a transmission speed switching control unit to set the transmission speed to communicate with the master station at the first or the second transmission speed according to the transmission speed instruction received from the master station, wherein the signal of which optical level is measured by the optical level detection section is a ranging response signal transmitted from the first slave station in a ranging process, in response to ranging request signals transmitted from the master station in the ranging process to adjust a difference in signal delay amount due to a difference in transmission distance from the master station to respective slave stations.

2. A passive optical network system comprising:

a master station to communicate at a first transmission speed and a second transmission speed higher than the first transmission speed;

a plurality of slave stations to communicate with the master station; and an optical fiber network which includes a splitter and in which a signal from the master station is branched by the splitter and is transmitted to the plurality of slave stations, wherein the plurality of slave stations include:

a first slave station that can communicate with the master station at the first and the second transmission speeds, and communicates with the master station at a transmission speed selected from the first and the second transmission speeds; and a second slave station to communicate with the master station at the first or the second transmission speed, wherein the master station includes:

a signal transmission section that transmits a first signal of the first transmission speed to the plurality of slave stations through the optical fiber network, and transmits a second signal of the second transmission speed to the plurality of slave stations through the optical fiber network, an optical level detection section to measure an optical level of a received signal; and a transmission speed determination section to store transmission speed information of the slave stations correspondingly to identifiers of the slave stations, wherein when the transmission speed determination section receives a first response signal from the first slave station that is previously set to one of the first and the second transmission speeds and receives the first or the second signal, the transmission speed determination section selects the second transmission speed when the optical level of the signal measured by the optical level detection section is a previously determined threshold or higher, selects the first transmission speed when the optical level is lower than the threshold, and stores transmission speed information indicating the selected first or second transmission speed correspondingly to the identifier of the first slave station, when the transmission speed determination section receives a second response signal from the second slave station that receives the first or the second signal, the transmission speed determination section stores, correspondingly to the identifier of the second slave station, transmission speed information indicating the transmission speed corresponding to the first or the second signal correspondingly to the identifier of the second slave station, and the master station time-division multiplexes data to the respective slave stations by the first transmission speed and the second transmission speed in accordance with the transmission speed information corresponding to the slave station, and transmits the data, wherein the first and the second signals are ranging request signals in a ranging process to adjust a difference in signal delay amount due to a difference in transmission distance from the master station to the respective slave stations, and the first and the second response signals are ranging response signals in the ranging process.

3. The passive optical network system according to claim 2, wherein the master station transmits a transmission speed instruction to communicate at the selected first or second transmission speed to the first slave station, and the first slave station communicates with the master station at the transmission speed in accordance with the transmission speed instruction.

4. The passive optical network system according to claim 2, wherein the master station further includes a bandwidth information generation section to determine transmission timings of data to be transmitted to the respective slave stations by the master station.

5. The passive optical network system according to claim 4, wherein the master station transmits information of the determined transmission timings and transmission speed information of the data to be transmitted at the respective transmission timings to the plurality of slave stations, and the plurality of slave stations capture data of the timing corresponding to the first or the second transmission speed of its own slave station among the data inputted from the optical fiber network in accordance with the transmission timings and the transmission speed information.

6. The passive optical network system according to claim 4, wherein the master station transmits information of the determined transmission timings and slave station identification information which indicates destinations of frames transmitted at the respective transmission timings to the plurality of slave stations, and the plurality of slave stations capture data of the timing in which the slave station identification information indicates its own slave station among the data inputted from the optical fiber network in accordance with the transmission timings and the slave station identification information.

7. The passive optical network system according to claim 4, wherein the master station sequentially transmits a first frame and a second frame, including data to the plurality of slave stations, information of the determined transmission timings, and the transmission speed information or identification information of the slave stations at the respective transmission timings, and the first frame includes information of a transmission timing of data transmitted in the second frame, and the transmission speed information or the identification information of the slave stations at the respective transmission timings.

8. The passive optical network system according to claim 4, wherein the master station further comprises:
- a speed conversion section to convert data of the second transmission speed into data of the first transmission speed and to output it;
- a signal division section to output, based on the determined transmission timing, the data of the second transmission speed to the speed conversion section at the transmission timing when transmission is performed at the first transmission speed; and
- a signal multiplexing section to multiplex the data of the second transmission speed and the data of the first transmission speed converted by the speed conversion section and to transmit them.

9. The passive optical network system according to claim 2, wherein the master station further comprises:
- a grant designation generation section that determines upstream transmission timings when the respective plurality of slave stations transmit frames, and generates a grant including information of the determined upstream transmission timings and transmission speed information of the respective slave stations which transmit data at the respective upstream transmission timings, and
- a transmission speed switching control section to switch, in accordance with the grant and at each of the upstream transmission timings of the respective slave stations, transmission speed to the first or the second transmission speed corresponding to the transmission speed information of the slave station to receive the frame from the respective slave stations.

10. A passive optical network system comprising:
- a master station to communicate at a first transmission speed and a second transmission speed higher than the first transmission speed; and
- slave stations including a first slave station that can communicate with the master station through an optical fiber network at the first and the second transmission speeds, and communicates with the master station at a transmission speed selected from the first and the second transmission speeds,
- wherein the first slave station includes:
- an optical level detection section to measure an optical level of a signal received from the master station;
- a transmission speed determination section that selects the second transmission speed when the measured optical level is a previously determined threshold or higher, selects the first transmission speed when the optical level is lower than the previously determined threshold, and notifies the master station of the selected first or second transmission speed; and
- a transmission speed switching control section to set the transmission speed to communicate with the master station at the selected first or second transmission speed, and
- wherein the master station sets the transmission speed to communicate with the first slave station in accordance with the notified transmission speed,
- wherein
- the signal of which optical level is measured by the optical level detection section is a ranging request signal transmitted from the master station in the ranging process to adjust a difference in signal delay amount due to a difference in transmission distance from the master station to respective slave stations.

11. A passive optical network system comprising:
- a master station to communicate at a first transmission speed and a second transmission speed higher than the first transmission speed;
- a plurality of slave stations to communicate with the master station; and
- an optical fiber network which includes a splitter and in which a signal from the master station is branched by the splitter and is transmitted to the plurality of slave stations,
- wherein the plurality of slave stations include:
- a first slave station that can communicate with the master station at the first and the second transmission speeds, and communicates with the master station at a transmission speed selected from the first and the second transmission speeds; and
- a second slave station to communicate with the master station at the first or the second transmission speed,
- wherein the master station includes
- a transmission speed storage section to store transmission speeds of the slave stations correspondingly to identifiers of the plurality of slave stations,
- wherein the first slave station includes:
- an optical level detection section to measure an optical level of a signal received from the master station;
- a transmission speed determination section that selects the second transmission speed when the measured optical level is a previously determined threshold or higher, selects the first transmission speed when the optical level is lower than the previously determined threshold, and notifies the master station of the selected first or second transmission speed; and
- a transmission speed switching control section to set the transmission speed to communicate with the master station at the selected first or second transmission speed,
- wherein
- the second slave station notifies the master station that communication is performed at the first or the second transmission speed, and
- the master station stores transmission speed information indicating the notified transmission speeds into the transmission speed storage section correspondingly to identifiers of the slave stations, and
- the master station time-division multiplexes data to the respective slave stations by the first transmission speed and the second transmission speed in accordance with the transmission speed information corresponding to the slave stations,
- wherein
- the signal of which optical level is measured by the optical level detection section is a ranging request signal transmitted from the master station in the ranging process to adjust a difference in signal delay amount due to a difference in transmission distance from the master station to respective slave stations.

12. An optical line terminator in a passive optical network system including the optical line terminator that communicates at a first transmission speed and a second transmission speed higher than the first transmission speed, and optical network units including a first optical network unit that can communicate with the optical line terminator at the first and the second transmission speeds through an optical fiber network, and communicates with the optical line terminator at a transmission speed selected from the first and the second transmission speeds, the optical line terminator comprising:

an optical level detection section to measure an optical level of a signal received from the first optical network unit; and a transmission speed determination section that selects the second transmission speed when the measured optical level is a previously determined threshold or higher, selects the first transmission speed when the optical level is lower than the previously determined threshold, and transmits a transmission speed instruction indicating the selected first or second transmission speed to the first optical network unit through the optical fiber network, wherein the optical line terminator communicates with the first optical network unit at the selected first or second transmission speed, wherein the signal of which optical level is measured by the optical level detection section is a ranging response signal transmitted from the first optical network unit in a ranging process, in response to ranging request signals transmitted from the optical line terminator in the ranging process to adjust a difference in signal delay amount due to a difference in transmission distance from the optical line terminator to respective optical network units.

13. An optical network unit in a passive optical network system including an optical line terminator that communicates at a first transmission speed and a second transmission speed higher than the first transmission speed, and optical network units including the optical network unit that can communicate with the optical line terminator at the first and the second transmission speeds through an optical fiber network, and communicates with the optical line terminator at a transmission speed selected from the first and the second transmission speeds, the optical network unit comprising:

an optical level detection section to measure an optical level of a signal received from the optical line terminator;

a transmission speed determination section that selects the second transmission speed when the measured optical level is a previously determined threshold or higher, selects the first transmission speed when the optical level is lower than the previously determined threshold, and notifies the optical line terminator of the selected first or second transmission speed; and a transmission speed switching control section to set the transmission speed to communicate with the optical line terminator at the selected first or second transmission speed, wherein the signal of which optical level is measured by the optical level detection section is a ranging request signal transmitted from the optical line terminator in the ranging process to adjust a difference in signal delay amount due to a difference in transmission distance from the optical line terminator to respective optical network units.

* * * * *